(12) United States Patent
Kurashina et al.

(10) Patent No.: US 8,936,712 B2
(45) Date of Patent: Jan. 20, 2015

(54) WATER ELECTROLYSIS SYSTEM AND METHOD FOR OPERATING THE SAME

(75) Inventors: Daisuke Kurashina, Saitama (JP); Koji Nakazawa, Utsunomiya (JP); Hisashi Nagaoka, Utsunomiya (JP); Hiroyuki Ishikawa, Utsunomiya (JP); Yuji Yamakawa, Saitama (JP); Jun Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 13/596,484

(22) Filed: Aug. 28, 2012

(65) Prior Publication Data
US 2013/0048507 A1 Feb. 28, 2013

(30) Foreign Application Priority Data

Aug. 31, 2011 (JP) ................................. 2011-188814
Feb. 10, 2012 (JP) ................................. 2012-027051

(51) Int. Cl.
  *C25B 15/02* (2006.01)
  *C25B 1/12* (2006.01)
  *C25B 15/08* (2006.01)

(52) U.S. Cl.
  CPC . *C25B 1/12* (2013.01); *C25B 15/08* (2013.01); *C25B 15/02* (2013.01); *Y02E 60/366* (2013.01)
  USPC ........ 205/628; 205/637; 205/335; 204/228.1; 204/229.2; 204/229.4; 204/229.8; 204/230.2

(58) Field of Classification Search
  CPC ........................... C25B 15/02; C25B 1/02–1/12
  USPC ......... 205/628–639; 204/228.1, 229.2, 229.4, 204/229.8, 230.2
  See application file for complete search history.

(56) References Cited

U.S. PATENT DOCUMENTS

| | | | | |
|---|---|---|---|---|
| 5,484,512 | A | * | 1/1996 | Sasaki et al. ................... 205/628 |
| 2008/0296171 | A1 | * | 12/2008 | Davidson ....................... 205/639 |
| 2010/0051473 | A1 | * | 3/2010 | Okabe et al. ................... 205/637 |

FOREIGN PATENT DOCUMENTS

| | | |
|---|---|---|
| JP | 08-085892 A | 4/1996 |
| JP | 2004-149890 A | 5/2004 |
| JP | 2011-162818 A | 8/2011 |

OTHER PUBLICATIONS

Japanese Office Action application No. 2011-188814 dated Sep. 17, 2013.

*Primary Examiner* — James Lin
*Assistant Examiner* — Brian W Cohen
(74) *Attorney, Agent, or Firm* — Squire Patton Boggs (US) LLP

(57) ABSTRACT

A water electrolysis system includes a high-pressure hydrogen production unit for electrolyzing water to generate oxygen and high-pressure hydrogen (the pressure of the high-pressure hydrogen being higher than that of the oxygen), and a gas-liquid separation unit for removing water contained in the high-pressure hydrogen. The gas-liquid separation unit is placed on a hydrogen pipe for discharging the high-pressure hydrogen from the high-pressure hydrogen production unit. In addition, the water electrolysis system includes a high-pressure hydrogen supply pipe for transferring dewatered high-pressure hydrogen from the gas-liquid separation unit, a cooling unit, which is placed on the high-pressure hydrogen supply pipe and is capable of variably controlling the temperature of the high-pressure hydrogen to adjust the humidity of the high-pressure hydrogen, and a control unit.

3 Claims, 23 Drawing Sheets

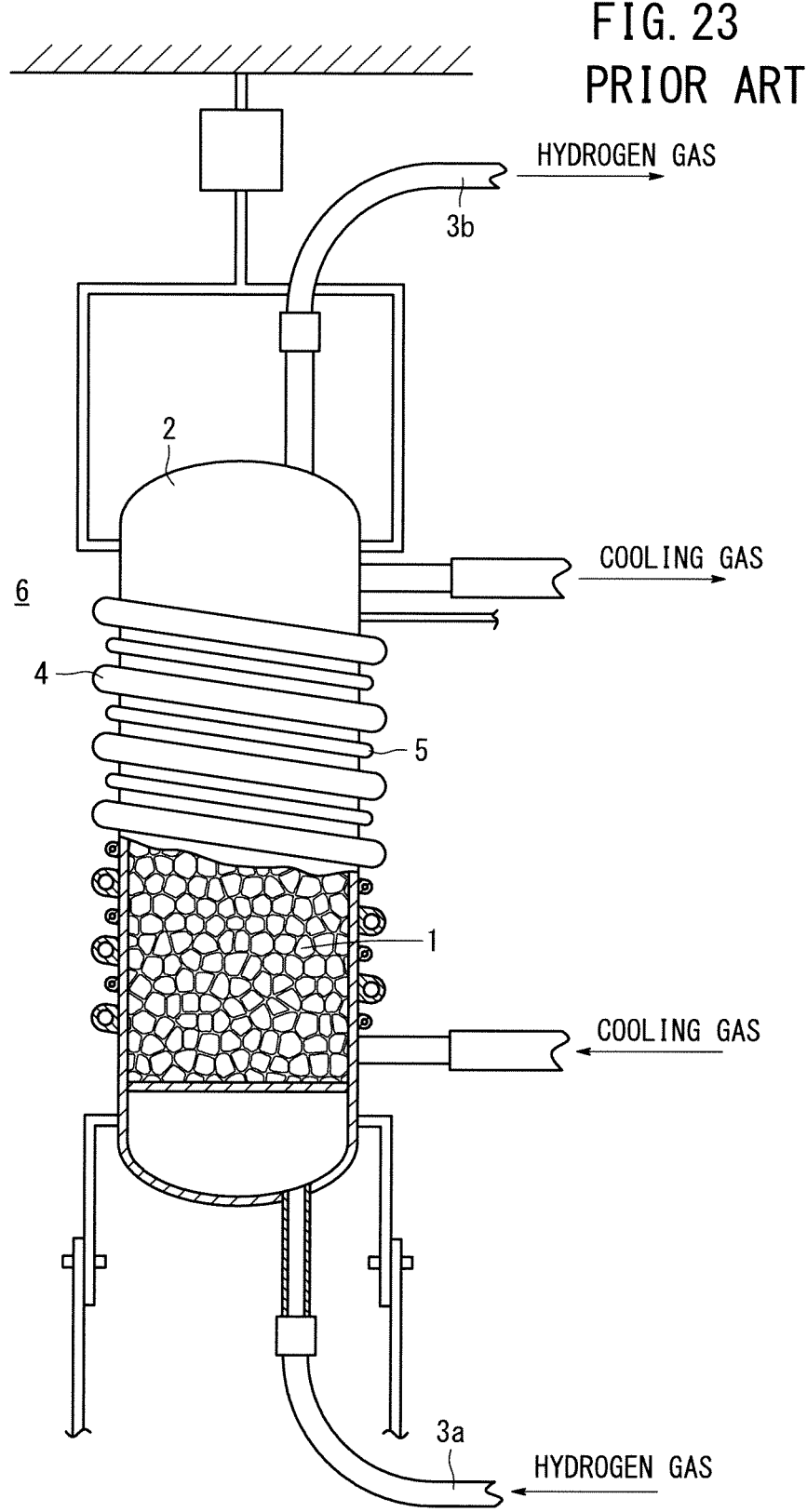

WATER ELECTROLYSIS SYSTEM AND METHOD FOR OPERATING THE SAME

CROSS-REFERENCE TO RELATED APPLICATION

This application is based upon and claims the benefit of priority from Japanese Patent Applications No. 2011-188814 filed on Aug. 31, 2011, and No. 2012-027051 filed on Feb. 10, 2012, of which the contents are incorporated herein by reference.

BACKGROUND OF THE INVENTION

1. Field of the Invention

The present invention relates to a water electrolysis system, which has a high-pressure hydrogen production unit for electrolyzing water to generate oxygen at an anode side and hydrogen at a cathode side, and a hydrogen supply pipe for supplying hydrogen generated in the production unit. The present invention also relates to a method for operating such a system.

2. Description of the Related Art

In fuel cells, hydrogen generally is used as a fuel gas for performing a power generation reaction. For example, a water electrolysis apparatus is used to produce hydrogen. The water electrolysis apparatus contains a solid polymer electrolyte membrane (an ion-exchange membrane) for decomposing water to generate hydrogen (and oxygen). Electrode catalyst layers are formed on either side of the solid polymer electrolyte membrane to thereby prepare a membrane-electrode assembly, and current collectors are placed on either side of the membrane-electrode assembly to produce a unit cell.

A plurality of such unit cells are stacked, a voltage is applied to respective ends of the cell stack in the stacking direction, and water is supplied to the anode-side current collector. Then, the water is decomposed to generate hydrogen ions (protons) at the anode side of the membrane-electrode assembly. The hydrogen ions permeate through the solid polymer electrolyte membrane to the cathode side, and become bonded with electrons to produce hydrogen. Meanwhile, at the anode side, oxygen generated simultaneously with the hydrogen is discharged together with residual water from the cell stack.

Hydrogen generated by the water electrolysis apparatus contains water. A hydrogen product for a fuel cell vehicle or the like is required to be in a desired dry state (to have a desired water concentration). For example, the product comprises hydrogen having a water amount of 5 ppm or less (hereinafter referred to as dry hydrogen).

For example, a known dehumidification mechanism for removing water contained in hydrogen is disclosed in Japanese Laid-Open Patent Publication No. 2004-149890. As shown in FIG. 23, the dehumidification mechanism contains a dehumidification unit 6. The dehumidification unit 6 has a main vessel body 2, a dehumidifying agent 1 for dehumidifying untreated gas contained in the main vessel body 2, and a hydrogen gas supply pipe 3a and a hydrogen gas discharge pipe 3b connected to lower and upper ends of the main vessel body 2. The dehumidification unit 6 further has a cooling trace 4 for circulating a cooling gas, which is wound helically at approximately regular intervals on the outer surface of the main vessel body 2, and a heating wire 5, which is arranged within the cooling trace 4 parallel and adjacent to the cooling trace 4.

In the dehumidification mechanism, hydrogen gas generated by electrolysis is transferred to the dehumidification unit 6 in a dehumidification step, and is introduced into the main vessel body 2 through the lower hydrogen gas supply pipe 3a. The hydrogen gas is dehumidified to a predetermined dew point by the dehumidifying agent 1, and then is discharged from the upper hydrogen gas discharge pipe 3b to the outside of the main vessel body 2, and is supplied to a hydrogen storage unit such as a hydrogen tank.

The recovery process of the dehumidification unit 6 contains the steps of heating the dehumidifying agent 1 to remove water, and cooling the heated dehumidifying agent 1 to an approximately normal temperature. More specifically, in the heating step, the entire main vessel body 2 is heated by the heating wire 5. In the cooling step, cooling gas is introduced into the cooling trace 4, whereby the dehumidifying agent 1 is cooled to regain a predetermined dehumidification capability.

SUMMARY OF THE INVENTION

However, since the recovery process contains the heating and cooling steps, the above dehumidification mechanism requires a long recovery time due to the temperature change. Furthermore, it is necessary to apply a large amount of electricity to the heating wire 5, and thus a water electrolysis apparatus using the dehumidification mechanism is poor in operational efficiency.

In addition, on initial start up (activation) or after maintenance of the water electrolysis apparatus has been performed, water attached to the hydrogen gas discharge pipe 3b located downstream of the dehumidification unit 6 is often dropped therefrom. Such dropped water is introduced into the hydrogen storage unit, so that the hydrogen stored therein exhibits a water amount of more than 5 ppm.

A general object of the present invention is to provide a water electrolysis system capable of minimizing energy consumption for hydrogen dehumidification, and which exhibits improved economic efficiency, convenience, and operational efficiency.

Another object of the present invention is to provide a water electrolysis system operation method, which even in the event that water is introduced into a hydrogen storage unit, is capable of easily lowering the water amount in the unit to a threshold value or less.

The present invention relates to a water electrolysis system containing a high-pressure hydrogen production unit for electrolyzing water, thereby generating oxygen at an anode side and generating high-pressure hydrogen at a cathode side, the pressure of the high-pressure hydrogen being higher than that of the oxygen, a gas-liquid separation unit for removing water contained in the high-pressure hydrogen, and which is placed on a hydrogen pipe for discharging the high-pressure hydrogen from the high-pressure hydrogen production unit, and a hydrogen supply pipe for transferring dewatered high-pressure hydrogen from the gas-liquid separation unit.

In the water electrolysis system, a cooling unit for variably controlling temperature of the high-pressure hydrogen, thereby adjusting the humidity of the high-pressure hydrogen, is placed on the hydrogen supply pipe.

In the present invention, since the temperature of the high-pressure hydrogen can be variably controlled in the water electrolysis system, the high-pressure hydrogen can be dehumidified efficiently and reliably. Furthermore, excess energy consumption can be prevented during hydrogen dehumidification to thereby improve economic efficiency and convenience. Thus, the overall operational efficiency of the water electrolysis system can easily be improved using a simple and economical structure.

The present invention further relates to a method for operating a water electrolysis system containing a high-pressure hydrogen production unit for electrolyzing water, thereby generating oxygen at an anode side and generating hydrogen at a cathode side, a hydrogen storage unit for storing hydrogen discharged from the high-pressure hydrogen production unit, a hydrogen supply pipe for supplying hydrogen generated in the high-pressure hydrogen production unit to the hydrogen storage unit, and a water adsorption unit, which is connected to the hydrogen supply pipe, for adsorbing water contained in the hydrogen generated in the high-pressure hydrogen production unit.

The operation method includes the steps of starting the water electrolysis system, measuring an elapsed time from start of the water electrolysis system, and preventing electrolysis in the water electrolysis system from stopping if the measured elapsed time is less than a set time.

In the present invention, during a predetermined time after initiation of the water electrolysis system, stopping of electrolysis is prevented and the generated hydrogen is supplied to the hydrogen storage unit. Therefore, even if water attached to the hydrogen supply pipe is introduced into the hydrogen storage unit at the start of the water electrolysis system, the dry hydrogen generated by electrolysis can be supplied continuously to the hydrogen storage unit over the predetermined time, whereby the dew point in the hydrogen storage unit can be lowered to reliably maintain the water concentration at a threshold value or less.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 23 is a partially sectioned front view of a dehumidification unit according to the related art.

DESCRIPTION OF THE PREFERRED EMBODIMENTS

Figure 1:
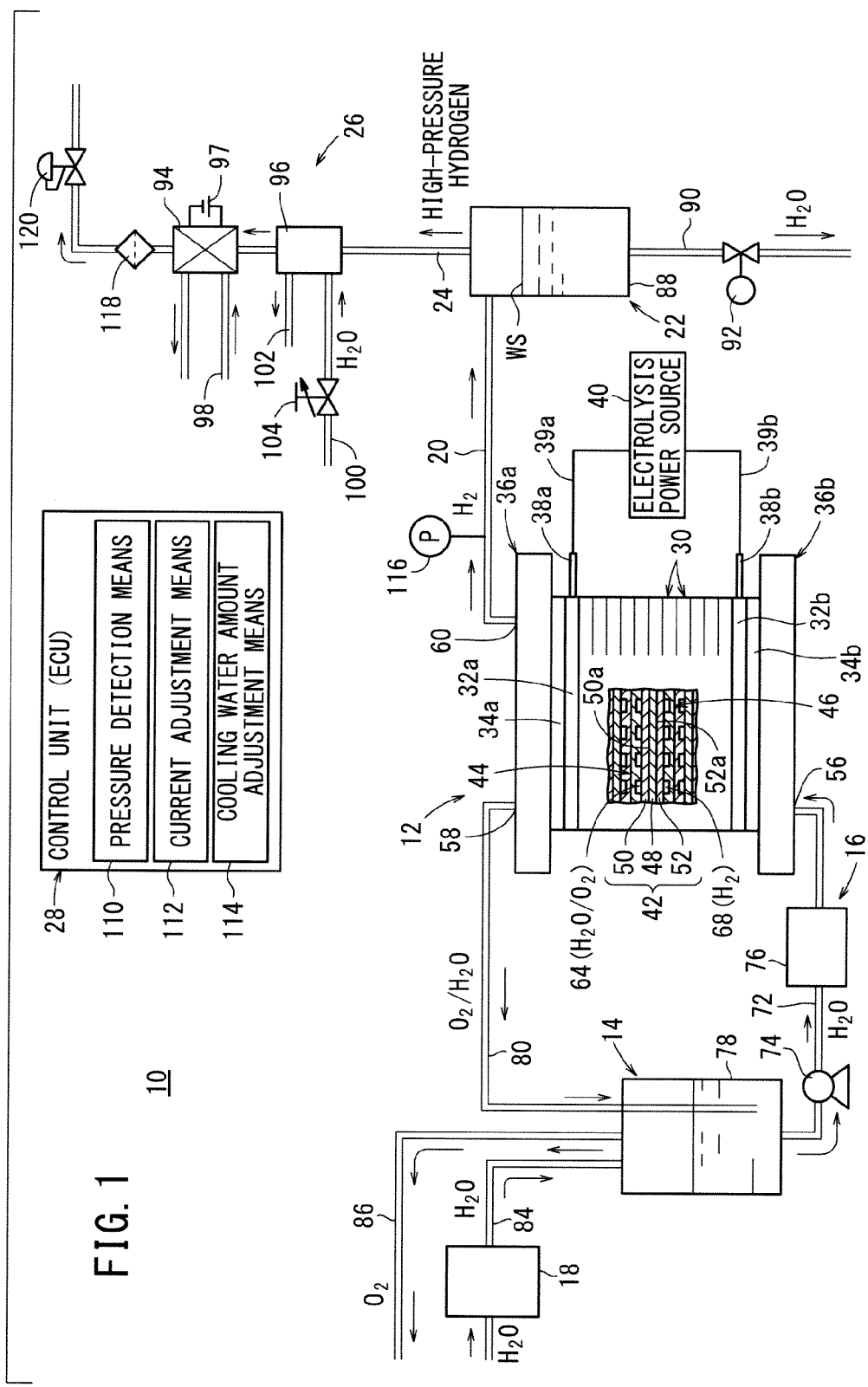
FIG. 1 is a schematic structural view of a water electrolysis system according to a first embodiment of the present invention.

As shown in FIG. 1, a water electrolysis system 10 according to a first embodiment of the present invention includes a high-pressure hydrogen production unit (differential pressure-type water electrolysis apparatus) 12 for electrolyzing water (pure water), thereby producing oxygen (at ordinary pressure) and high-pressure hydrogen (at a pressure higher than the oxygen pressure, e.g., 1 to 70 MPa). The water electrolysis system 10 further includes a water storage unit 14 for separating oxygen and residual water that is discharged from the high-pressure hydrogen production unit 12, and storing the water, a water circulation unit 16 for circulating the water stored in the water storage unit 14 through the high-pressure hydrogen production unit 12, and a water supply unit 18 for supplying pure water prepared from city water to the water storage unit 14.

The water electrolysis system 10 further includes a gas-liquid separation unit 22 for removing water contained in high-pressure hydrogen, which is discharged from the high-pressure hydrogen production unit 12 through a hydrogen pipe 20, and a high-pressure hydrogen supply pipe 24 for transferring dewatered high-pressure hydrogen from the gas-liquid separation unit 22. In addition, the water electrolysis system 10 includes a cooling unit 26, which is disposed on the high-pressure hydrogen supply pipe 24, for variably controlling temperature of the high-pressure hydrogen and thereby adjusting the humidity of the high-pressure hydrogen, together with a control unit (ECU) 28 for controlling the water electrolysis system 10 in its entirety.

The high-pressure hydrogen production unit 12 contains a cell stack prepared by stacking a plurality of unit cells 30. At one stacking-direction end of the unit cells 30, a terminal plate 32*a*, an insulation plate 34*a*, and an end plate 36*a* are disposed in this order in an outward direction. Similarly, at the other stacking-direction end of the unit cells 30, a terminal plate 32*b*, an insulation plate 34*b*, and an end plate 36*b* are disposed in this order in an outward direction. The unit cells 30, the terminal plates 32a and 32b, the insulation plates 34a and 34b, and the end plates 36a and 36b are integrally fastened and fixed together in the stacking direction.

Terminals 38a and 38b protrude outwardly from side surfaces of the terminal plates 32a and 32b respectively. The terminals 38a and 38b are electrically connected by wirings 39a and 39b to an electrolysis power source 40.

For example, the unit cell 30 contains a disk shaped membrane-electrode assembly 42, and further contains an anode-side separator 44 and a cathode-side separator 46 sandwiching the membrane-electrode assembly 42 therebetween. The shapes of the membrane-electrode assembly 42, the anode-side separator 44, and the cathode-side separator 46 are not limited to disk shapes, but may be selected from various shapes such as rectangular and square shapes.

For example, the membrane-electrode assembly 42 contains a solid polymer electrolyte membrane 48 prepared by impregnating a thin perfluorosulfonic acid membrane with water, and further contains an anode-side current collector 50 and a cathode-side current collector 52 disposed on either side of the solid polymer electrolyte membrane 48.

An anode catalyst layer 50a and a cathode catalyst layer 52a are formed on either side of the solid polymer electrolyte membrane 48. For example, the anode catalyst layer 50a contains a Ru (ruthenium) catalyst, and the cathode catalyst layer 52a contains a platinum catalyst.

A water supply through hole 56 for supplying water (pure water), a discharge through hole 58 for discharging oxygen generated by the reaction and the unreacted water, and a hydrogen through hole 60 for transferring hydrogen generated by the reaction are formed and extend in the stacking direction on the periphery of the unit cells 30.

A first flow path 64 connected to the water supply through hole 56 and the discharge through hole 58 is formed on the surface of the anode-side separator 44 facing the membrane-electrode assembly 42. The first flow path 64 is formed within a surface area of the anode-side current collector 50, and contains a plurality of flow channels and embossed portions, etc. The oxygen generated by the reaction and the unreacted water are transferred in the first flow path 64.

A second flow path 68, which is connected to the hydrogen through hole 60, is formed on the surface of the cathode-side separator 46 facing the membrane-electrode assembly 42. The second flow path 68 is formed within a surface area of the cathode-side current collector 52, and contains a plurality of flow channels and embossed portions, etc. The high-pressure hydrogen generated by the reaction is transferred to the second flow path 68.

The water circulation unit 16 has a circulation pipe 72 connected to the water supply through hole 56 in the high-pressure hydrogen production unit 12. A circulation pump 74 and an ion exchanger 76 are placed on the circulation pipe 72, and the end of the circulation pipe 72 is connected to the bottom of a tank 78 in the water storage unit 14.

One end of a return pipe 80 is connected to the top of the tank 78, and the other end thereof is connected to the discharge through hole 58 in the high-pressure hydrogen production unit 12. The one end of the return pipe 80 is positioned such that the one end is opened constantly and located in the water stored in the tank 78.

The tank 78 is connected to a pure water supply pipe 84, which extends from the water supply unit 18 to an oxygen discharge pipe 86, for discharging oxygen that is separated from the pure water in the tank 78.

One end of the hydrogen pipe 20 is connected to the hydrogen through hole 60 in the high-pressure hydrogen production unit 12, and the other end thereof is connected to the gas-liquid separation unit 22. The gas-liquid separation unit 22 has a tank 88 for storing water (WS). A drain line 90 is connected to the bottom of the tank 88, and a drain valve 92 is formed in the drain line 90.

High-pressure hydrogen is dewatered by the gas-liquid separation unit 22. The obtained dry hydrogen is introduced into the high-pressure hydrogen supply pipe 24. The cooling unit 26, which is placed on the high-pressure hydrogen supply pipe 24, contains a Peltier dehumidifier (Peltier element) 94 and a heat exchanger 96.

The Peltier dehumidifier 94 utilizes a Peltier element cooler and contains a variable source 97. A coolant pipe 98 is connected to the Peltier dehumidifier 94 in order to release heat from the high-temperature side. Instead of the coolant pipe 98, a radiation fin or the like may be used.

The heat exchanger 96 is located in series on an upstream side of the Peltier dehumidifier 94. The heat exchanger 96 is connected to a cooling water supply pipe 100 for supplying cooling water as a coolant, and a cooling water discharge pipe 102 for discharging the cooling water. A flow control valve 104 for variably controlling the flow rate of the cooling water introduced into the heat exchanger 96 is disposed on the cooling water supply pipe 100.

The cooling water discharge pipe 102 may be connected to the inlet side of the coolant pipe 98, such that water for electrolysis is circulated through the cooling water supply pipe 100. In this case, another water supply source is not required, whereby the overall structure of the water electrolysis system 10 can be simplified. Alternatively, the cooling water discharge pipe 102 may be provided separately from the coolant pipe 98, such that water for electrolysis is supplied to only one of the heat exchanger 96 and the Peltier dehumidifier 94.

The control unit 28 contains a pressure detection means (pressure detector) 110 for detecting the cathode-side pressure of the high-pressure hydrogen production unit 12, and a current adjustment means (current adjuster) 112 for variably controlling a current applied to the Peltier dehumidifier 94 based on the detected pressure. In addition, the control unit 28 further contains a cooling water amount adjustment means (coolant amount adjuster) 114 for variably controlling the amount of cooling water (coolant) introduced into the heat exchanger 96 based on the detected pressure.

A pressure sensor 116 for measuring the cathode-side pressure of the high-pressure hydrogen production unit 12 is placed on the hydrogen pipe 20. Measurement signals are transferred from the pressure sensor 116 to the pressure detection means 110.

A condenser 118 and a back pressure valve 120 are located on the high-pressure hydrogen supply pipe 24 on the downstream side of the cooling unit 26. For example, the condenser 118 contains a sintered filter or the like. The back pressure valve 120 is opened at a predetermined set pressure (e.g., 35 MPa) in order to supply high-pressure hydrogen as a hydrogen product to a fuel cell vehicle (not shown) or the like.

Figure 3:
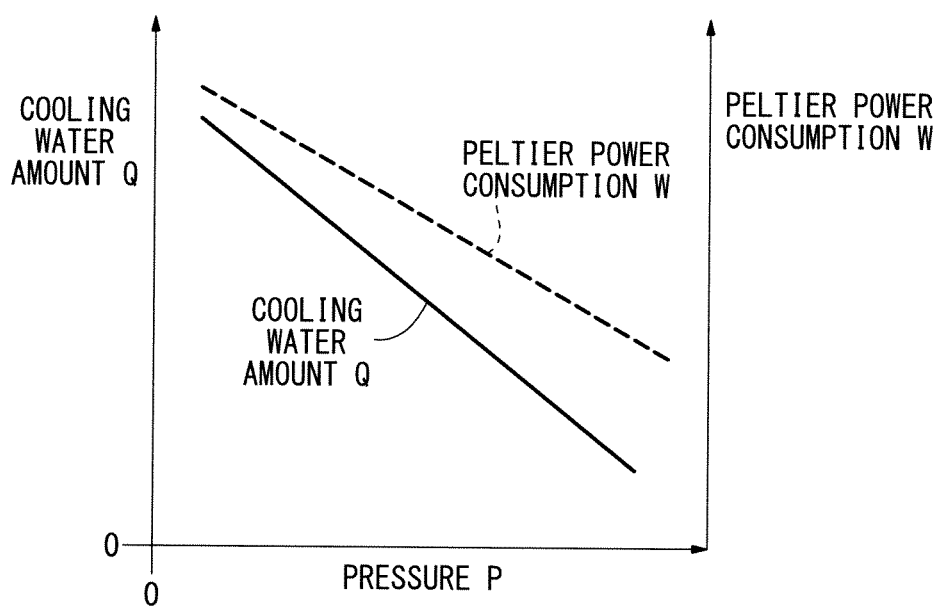
FIG. 3 is a characteristic map showing relationships between pressure, a cooling water amount, and Peltier power consumption.

For example, in the control unit 28 of the water electrolysis system 10, a map of FIG. 3 is prepared from the relationships between the cathode-side pressure P of the high-pressure hydrogen production unit 12, the Peltier power consumption W of the Peltier dehumidifier 94, and the cooling water amount Q of the heat exchanger 96, which is controlled based on the pressure P. A map is prepared based on the relationship between the hydrogen pressure and the water concentration shown in FIG. 4, as well as the relationship between the hydrogen temperature and the water concentration shown in FIG. 5.

Figure 4:
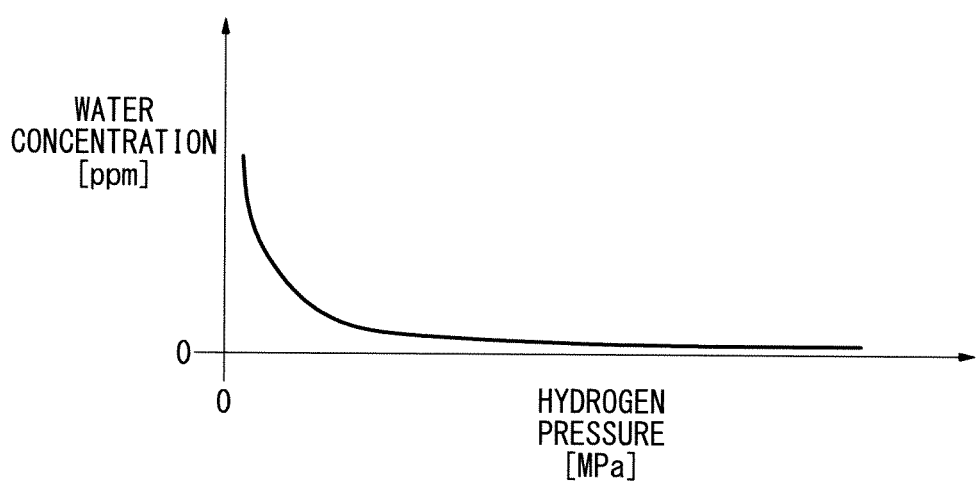
FIG. 4 is a characteristic curve showing a relationship between hydrogen pressure and water concentration.

More specifically, as shown in FIG. 4, the water concentration of the hydrogen decreases as the hydrogen pressure (cathode-side pressure P) increases (i.e., becomes higher). When the water concentration is decreased, the flow rate of the hydrogen is lowered. Therefore, hydrogen can be dehumidified more easily, and the Peltier power consumption W of the Peltier dehumidifier 94 required for dehumidification can be reduced.

Figure 5:
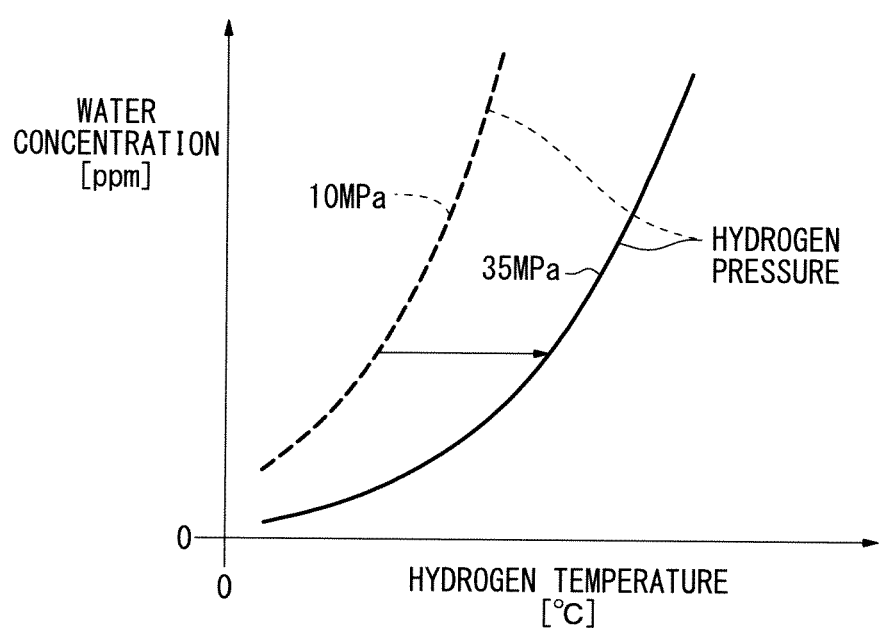
FIG. 5 is a characteristic curve showing a relationship between hydrogen temperature and water concentration.

Furthermore, as shown in FIG. 5, under a low hydrogen pressure (represented by the dashed line), in order to decrease the water concentration, the cooling water amount Q of the heat exchanger 96 must be increased in order to lower the hydrogen temperature. In contrast, under a high hydrogen pressure (represented by the continuous line), the water concentration can be decreased even at a higher hydrogen temperature, and thus the required cooling water amount Q can be reduced.

Operations of the water electrolysis system 10 having the structure shown in FIG. 1 will be described below with reference to the flowchart of FIG. 2.

When electrolysis is started in the water electrolysis system 10 (step S1), pure water prepared from city water is supplied from the water supply unit 18 to the tank 78 in the water storage unit 14.

The water in the tank 78 is supplied by the circulation pump 74 in the water circulation unit 16 through the circulation pipe 72 to the water supply through hole 56 in the high-pressure hydrogen production unit 12. Meanwhile, a voltage (an electrolytic current value A) is applied to the terminals 38a and 38b on the terminal plates 32a and 32b by the electrolysis power source 40, which is electrically connected thereto (step S2).

In each unit cell 30, water is supplied from the water supply through hole 56 to the first flow path 64 on the anode-side separator 44, and the water is transferred along the anode-side current collector 50. Thus, water is electrically decomposed on the anode catalyst layer 50a to generate hydrogen ions, electrons, and oxygen. Hydrogen ions generated by the positive electrode reaction are transferred through the solid polymer electrolyte membrane to the cathode catalyst layer 52a, and become bonded with electrons to produce hydrogen.

The produced hydrogen flows through the second flow path 68 between the cathode-side separator 46 and the cathode-side current collector 52. The hydrogen has a pressure, which is higher than that of the water in the water supply through hole 56, and thus the hydrogen can be transferred through the hydrogen through hole 60 and discharged to the outside of the high-pressure hydrogen production unit 12.

The oxygen generated in the reaction and unreacted water flow through the first flow path 64, and a fluid mixture thereof is discharged from the discharge through hole 58 to the return pipe 80 in the water circulation unit 16. The oxygen and the unreacted water are introduced to the tank 78 and separated therein. The separated water is introduced by the circulation pump 74 through the circulation pipe 72 and the ion exchanger 76, and into the water supply through hole 56. The separated oxygen is discharged to the outside through the oxygen discharge pipe 86.

Hydrogen generated in the high-pressure hydrogen production unit 12 is transferred through the hydrogen pipe 20 to the gas-liquid separation unit 22. In the gas-liquid separation unit 22, gaseous or liquid water (moisture) contamed in the hydrogen is separated from the hydrogen and stored in the tank 88. The resultant hydrogen is introduced into the high-pressure hydrogen supply pipe 24.

As described above, as water electrolysis and hydrogen production continue to be carried out in the high-pressure hydrogen production unit 12, the cathode-side pressure (hydrogen pressure) P is increased to the set pressure of the back pressure valve 120. The cathode-side pressure P of the high-pressure hydrogen production unit 12 is detected by the pressure detection means 110 in the control unit 28 based on the measurement signal from the pressure sensor 116 (step S3). Based on the detected pressure P, in the pressure detection means 110, a cooling water amount $Q_{map}$ of the cooling water supplied to the heat exchanger 96, and a Peltier power consumption $W_{map}$ of the current applied to the Peltier dehumidifier 94 are calculated and read out respectively, based on the relationships between the pressure P, the cooling water amount Q, and the Peltier power consumption W, as shown in the map of FIG. 3.

Based on the cooling water amount $Q_{map}$ read from the map of FIG. 3, the flow control valve 104 is controlled by the cooling water amount adjustment means 114 in order to adjust the amount Q of cooling water supplied from the cooling water supply pipe 100 to the heat exchanger 96 (step S4). Thus, heat exchange is performed between the cooling water and high-pressure hydrogen introduced through the high-pressure hydrogen supply pipe 24 into the heat exchanger 96, whereby the hydrogen is cooled to a temperature at which the hydrogen can be dehumidified to a desired water concentration (see FIG. 5).

High-pressure hydrogen is transferred from the heat exchanger 96 to the Peltier dehumidifier 94. Based on the Peltier power consumption $W_{map}$ read from the map of FIG. 3, the current (Peltier power consumption W) applied from the variable source 97 to the Peltier dehumidifier 94 is controlled by the current adjustment means 112 (step S4). Thus, high-pressure hydrogen is dehumidified to a desired humidity by the Peltier dehumidifier 94, whereby dry hydrogen is obtained.

Dry hydrogen is transferred from the Peltier dehumidifier 94 through the condenser 118 and to the back pressure valve 120. When the pressure of the dry hydrogen is increased to a set pressure, the back pressure valve 120 is opened to supply hydrogen as a hydrogen product to a fuel cell vehicle (not shown) or the like.

Then, the high-pressure hydrogen production unit is operated steadily (step S5), and electrolysis is stopped (step S6) in order to bring the operation of the water electrolysis system 10 to an end.

As described above, in the first embodiment, the cooling unit 26, which is capable of variably controlling temperature of the high-pressure hydrogen to adjust the humidity thereof, is disposed on the high-pressure hydrogen supply pipe 24. Therefore, even when the pressure of the high-pressure hydrogen increases or decreases due to any of various factors, the high-pressure hydrogen can be cooled sufficiently in the high-pressure hydrogen supply pipe 24 depending on the detected pressure. Thus, hydrogen is not cooled excessively by the cooling unit 26, and the overall operational efficiency of the water electrolysis system 10 can be improved.

Furthermore, in the water electrolysis system 10, power consumption of the Peltier dehumidifier 94 for dehumidifying hydrogen, and the amount Q of cooling water supplied to the heat exchanger 96 can be reduced to thereby curb energy consumption, and thus, economic efficiency and convenience can be improved. Thus, advantageously, the overall operational efficiency of the water electrolysis system 10 can be improved easily using a simple and economical structure.

The cooling unit 26 contains the Peltier dehumidifier 94 and the heat exchanger 96 located upstream of the Peltier dehumidifier 94. Therefore, the amount Q of cooling water and the Peltier power consumption W of the Peltier dehumidifier 94 can be variably controlled, respectively, depending on the detected cathode-side pressure P of the high-pressure hydrogen production unit 12, and based on relationships between the pressure P, the cooling water amount Q, and the Peltier power consumption W (the map of FIG. 3).

Thus, high-pressure hydrogen can be dehumidified to a desired water concentration using a minimum amount Q of cooling water and minimum Peltier power consumption W, whereby advantageously, the operational efficiency of the water electrolysis system 10 can be significantly improved.

In addition, since the heat exchanger 96 is located upstream of the Peltier dehumidifier 94, high-pressure hydrogen is transferred to the Peltier dehumidifier 94 after water contained in the hydrogen primarily is removed by the heat exchanger 96. Therefore, advantageously, power consumption (Peltier power consumption W) of the Peltier dehumidifier 94 can be reduced.

Figure 6:
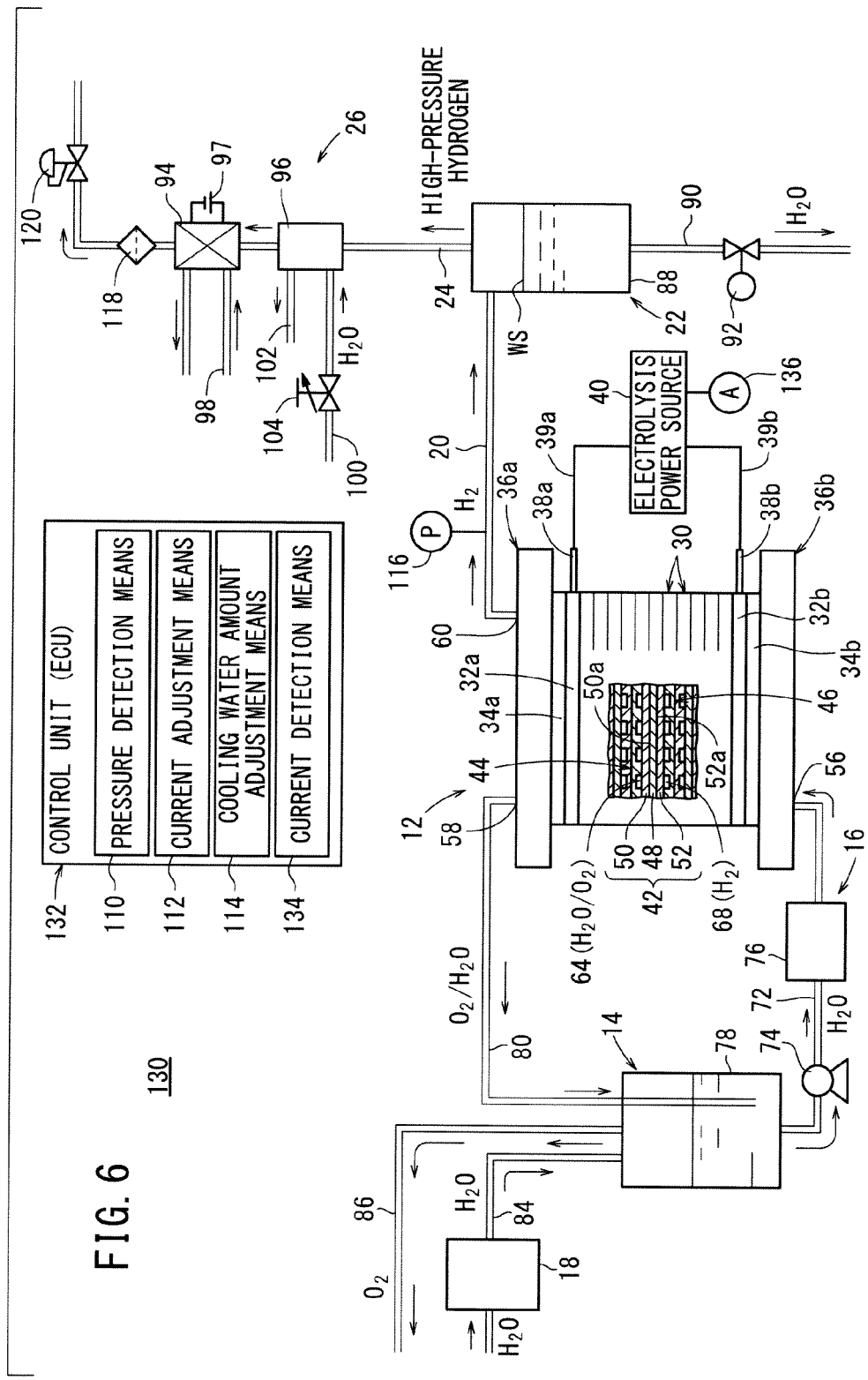
FIG. 6 is a schematic structural view of a water electrolysis system according to a second embodiment of the present invention.

A water electrolysis system 130 according to a second embodiment of the present invention is shown in FIG. 6. The same components are marked using the same reference numerals in the water electrolysis system 130 of the second embodiment and the water electrolysis system 10 of the first embodiment, and detailed explanations of such features are omitted in the second embodiment. Detailed explanations of such features also are omitted in the third to eighth embodiments, to be described hereinafter.

The water electrolysis system 130 includes a control unit 132, which corresponds to the control unit 28 of the first embodiment. The control unit 132 contains a current detection means (current detector) 134 for detecting an electrolytic current value A of the high-pressure hydrogen production unit 12. In the high-pressure hydrogen production unit 12, a current detection sensor 136 for detecting the electrolytic current value A is disposed on the electrolysis power source 40.

Figure 8:
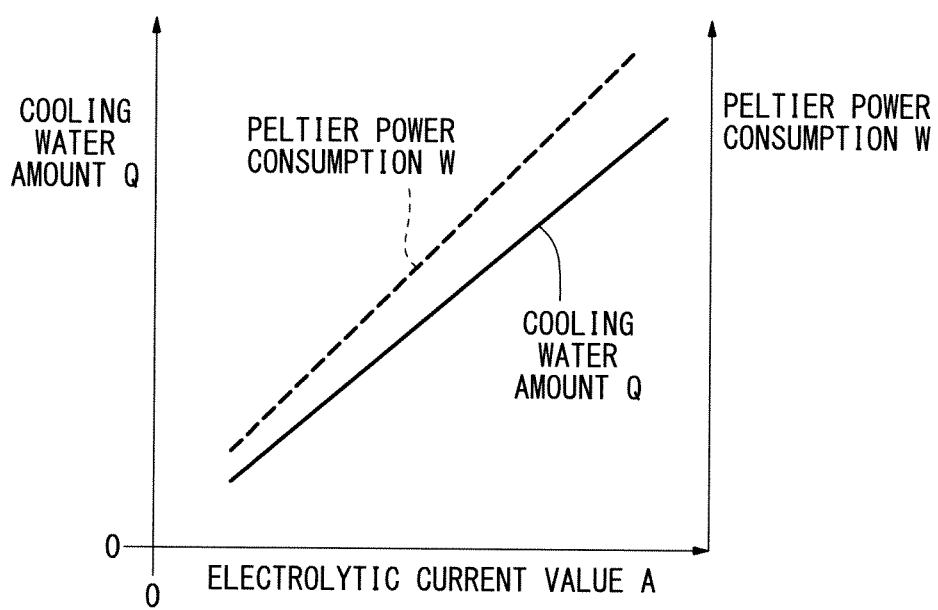
FIG. 8 is a characteristic map showing relationships between an electrolytic current value, a cooling water amount, and Peltier power consumption.

For example, in the control unit 132 of the water electrolysis system 130, at a constant cathode-side pressure P of the high-pressure hydrogen production unit 12, the map shown in FIG. 8 is prepared from relationships between the electrolytic current value A of the electrolysis power source 40 and the cooling water amount Q of the heat exchanger 96. The Peltier power consumption W of the Peltier dehumidifier 94 is controlled based on the current value A.

The amount of produced hydrogen can be changed by controlling the electrolytic current value A. For example, as shown in the map of FIG. 8, when the electrolytic current value A is increased, the cooling water amount Q and the Peltier power consumption W are increased in order to efficiently cool and dehumidify the increased hydrogen amount.

Figure 7:
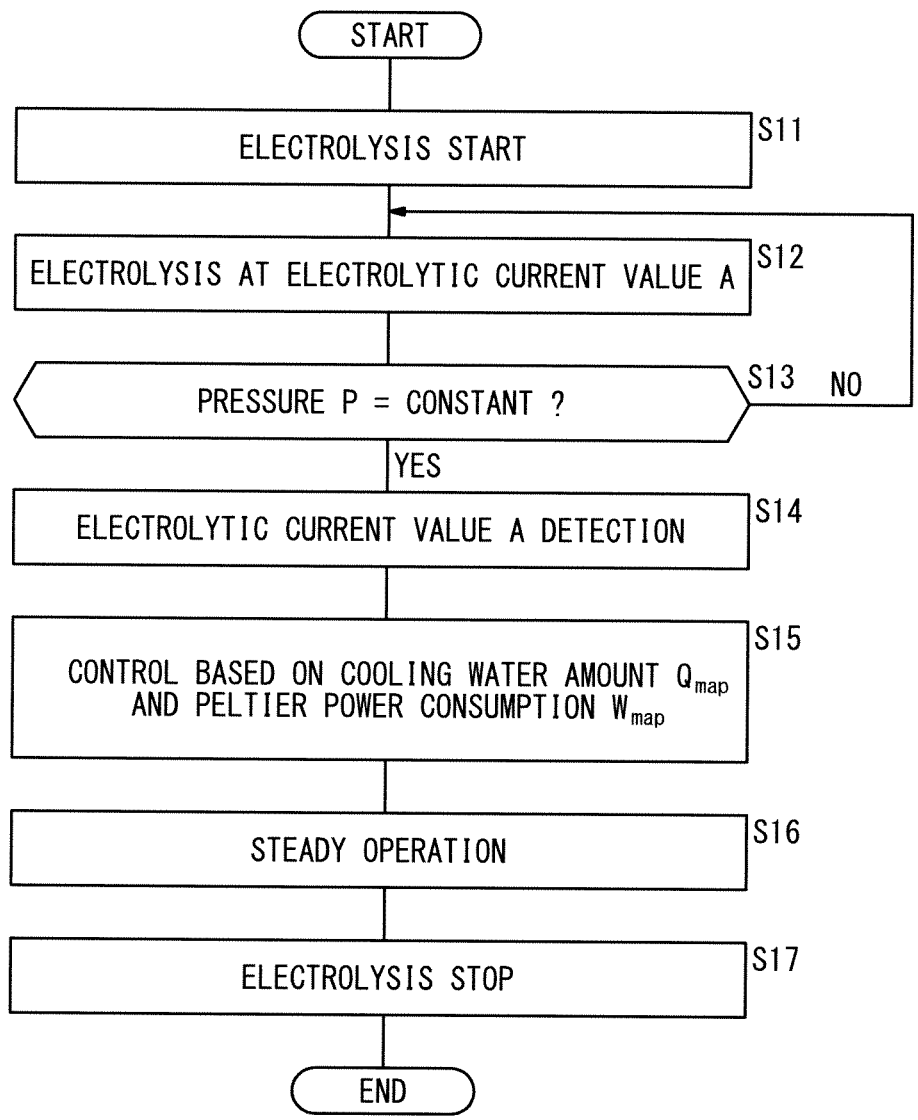
FIG. 7 is a flowchart illustrating operations of the water electrolysis system of FIG. 6.

Operations of the water electrolysis system 130 having the above structure will be described below with reference to the flowchart of FIG. 7. Steps S11, S12, S16, and S17 are the same, respectively, as steps S1, S2, S5, and S6 of the first embodiment (see FIG. 2).

Water electrolysis is started in the water electrolysis system 130 (step S11) and is carried out at an electrolytic current value A in the high-pressure hydrogen production unit 12 (step S12). The cathode-side pressure P of the high-pressure hydrogen production unit 12 is detected by the pressure detection means 110. When the detected pressure P is judged to have become constant (YES in step S13), the next step S14 is carried out.

In step S14, the electrolytic current value A is detected by the current detection means 134 using the current detection sensor 136 disposed on the electrolysis power source 40. A cooling water amount $Q_{map}$ of the heat exchanger 96 and a Peltier power consumption $W_{map}$ of the Peltier dehumidifier 94, which correspond to the detected electrolytic current value A, are calculated or read out respectively from the relationships between the electrolytic current value A, the cooling water amount Q, and the Peltier power consumption W, as shown in the map of FIG. 8. Based on the cooling water amount $Q_{map}$ and the Peltier power consumption $W_{map}$, the amount Q of the cooling water supplied to the heat exchanger 96, and the current value applied from the variable source 97 to the Peltier dehumidifier 94 are controlled (step S15). Then, the water electrolysis system 130 is operated steadily (step S16), and thereafter, electrolysis is stopped (step S17).

Consequently, in the second embodiment, when the pressure P of the high-pressure hydrogen in the hydrogen pipe 20 is maintained at a constant pressure, although the hydrogen production amount changes depending on the electrolytic current value A of the electrolysis power source 40, hydrogen can be dehumidified using a minimum cooling water amount Q and minimum Peltier power consumption W. Therefore, power consumption of the Peltier dehumidifier 94 for dehumidifying hydrogen, and the amount Q of cooling water supplied to the heat exchanger 96 can be reduced in order to curb energy consumption, and advantageously, the same effects as those of the first embodiment can be achieved as well in the second embodiment. For example, in the second embodiment as well, overall operational efficiency of the water electrolysis system 130 can be improved significantly.

Figure 9:
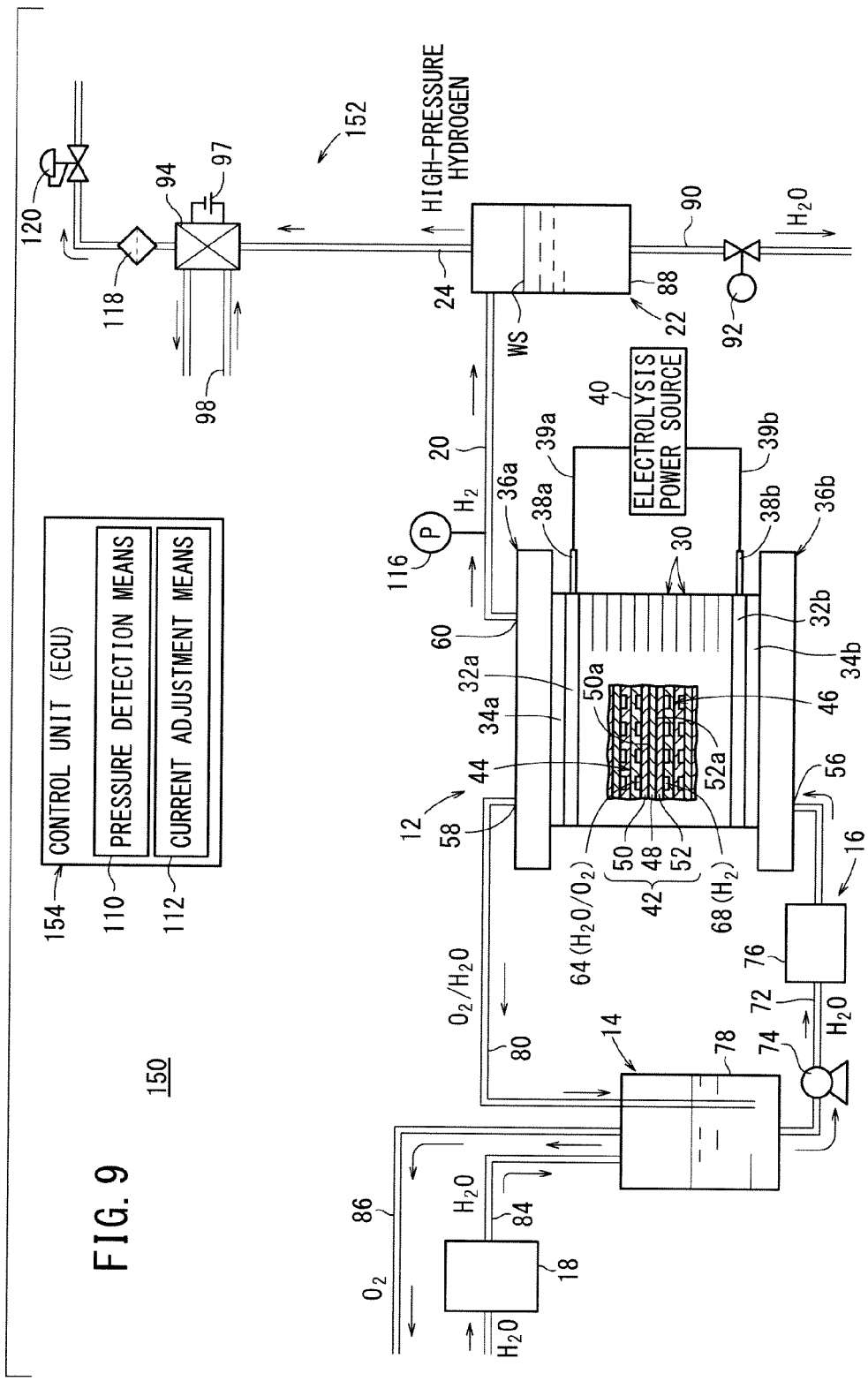
FIG. 9 is a schematic structural view of a water electrolysis system according to a third embodiment of the present invention.

A water electrolysis system 150 according to a third embodiment of the present invention is shown in FIG. 9.

The water electrolysis system 150 has a cooling unit 152 and a control unit 154, which correspond to the cooling unit 26 and the control unit 28 of the first embodiment. Similar to the first embodiment, the cooling unit 152 contains the Peltier dehumidifier 94, and the control unit 154 contains the pressure detection means 110 and the current adjustment means 112, however, the water electrolysis system 150 does not have the heat exchanger 96 or the cooling water amount adjustment means 114.

Figure 10:
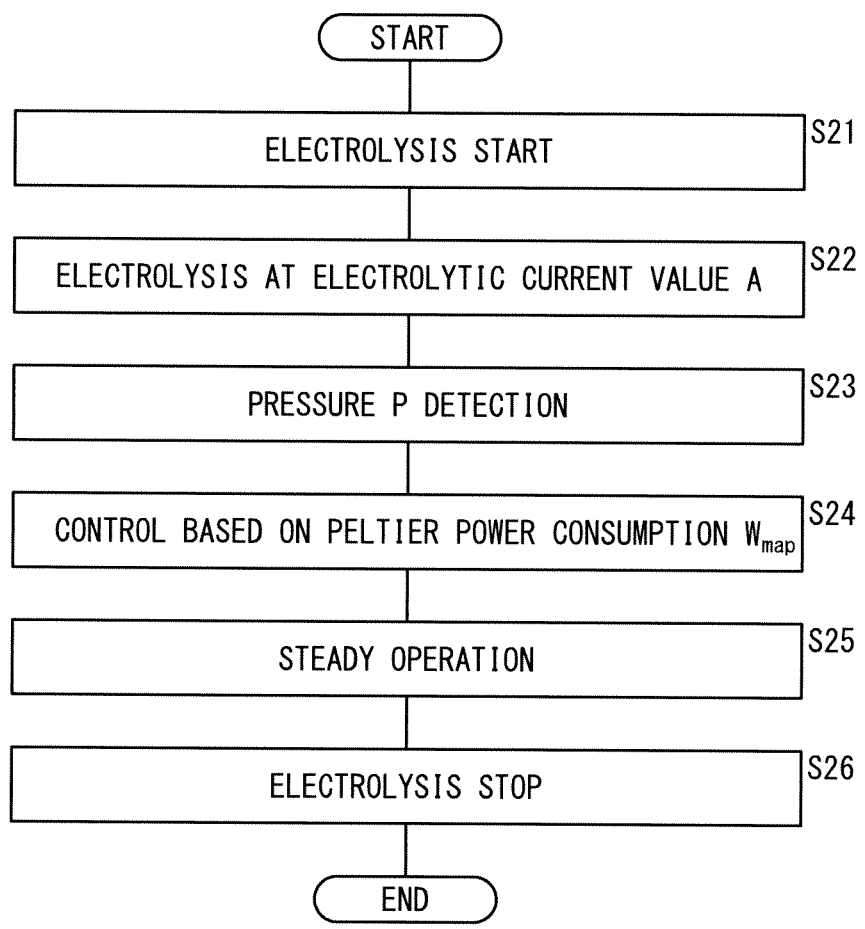
FIG. 10 is a flowchart illustrating operations of the water electrolysis system of FIG. 9.

The water electrolysis system 150 is operated in accordance with the flowchart of FIG. 10, which contains steps S21 to S26. Steps S21 to S23, S25, and S26 are the same as steps S1 to S3, S5, and S6 of the first embodiment (see FIG. 2), respectively, and detailed explanations of such steps are omitted in the third embodiment.

After steps S21 and S22, in step S23, the pressure P is detected by the pressure detection means 110. Based on the detected pressure P, the Peltier power consumption $W_{map}$ is read out from the relationship between the pressure P and the Peltier power consumption W, as shown in FIG. 3. Based on the Peltier power consumption $W_{map}$, the current value applied to the Peltier dehumidifier 94 is controlled by the current adjustment means 112 (step S24). Thereafter, steps S25 and S26 are carried out.

Consequently, in the water electrolysis system 150 according to the third embodiment, electricity is not applied excessively to the Peltier dehumidifier 94. Therefore, advantageously, the same effects as those of the first and second embodiments can also be achieved in the third embodiment. For example, energy consumption required for hydrogen dehumidification can be minimized as well in the third embodiment.

Figure 11:
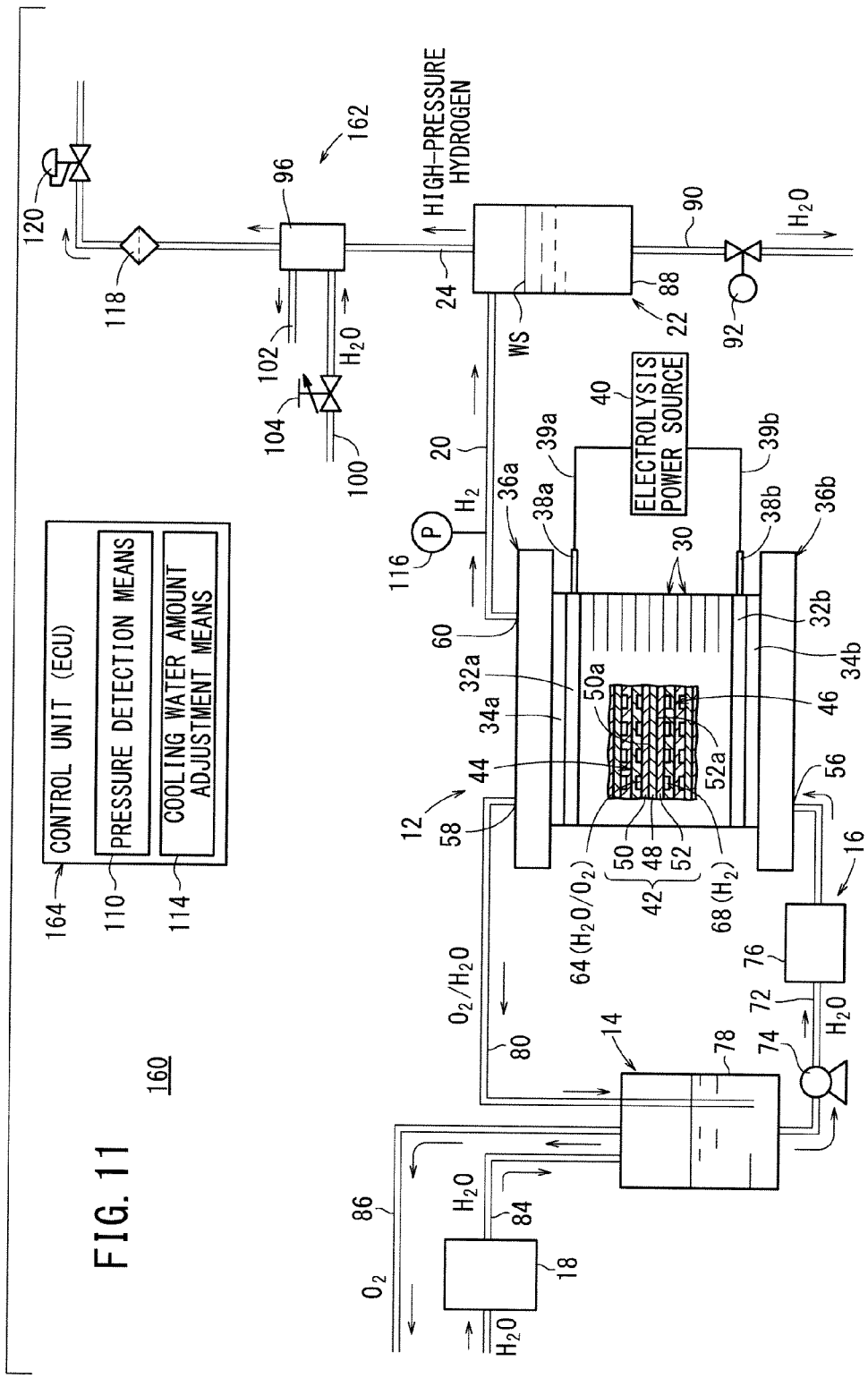
FIG. 11 is a schematic structural view of a water electrolysis system according to a fourth embodiment of the present invention.

A water electrolysis system 160 according to a fourth embodiment of the present invention is shown in FIG. 11.

The water electrolysis system 160 has a cooling unit 162 and a control unit 164, which correspond to the cooling unit 26 and the control unit 28 of the first embodiment. The cooling unit 162 contains the heat exchanger 96. The control unit 164 contains the pressure detection means 110 and the cooling water amount adjustment means 114. The water electrolysis system 160 does not have the Peltier dehumidifier 94 or the current adjustment means 112.

Figure 12:
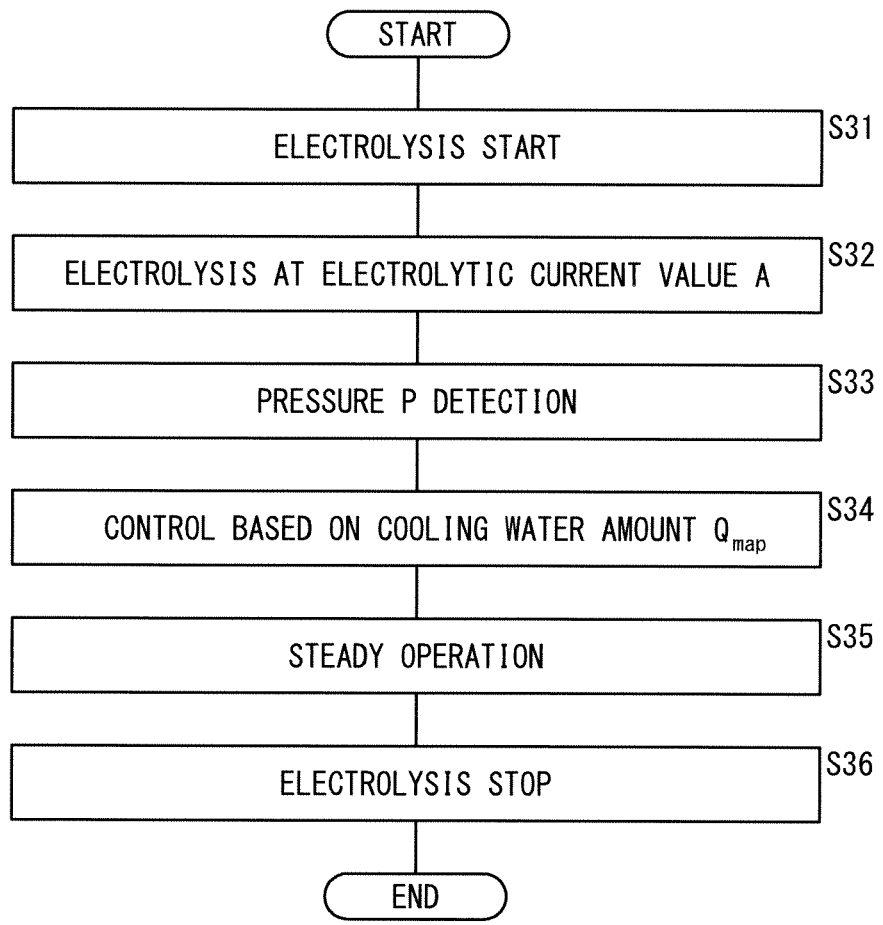
FIG. 12 is a flowchart illustrating operations of the water electrolysis system of FIG. 11.

The water electrolysis system 160 is operated in accordance with the flowchart of FIG. 12, which contains steps S31 to S36. Steps S31 to S33, S35, and S36 are the same as steps S1 to S3, S5, and S6 of the first embodiment (see FIG. 2), respectively, and detailed explanations of such steps are omitted in the fourth embodiment.

After steps S31 and S32, the pressure P is detected by the pressure detection means 110 in step S33. Based on the detected pressure P, the cooling water amount $Q_{map}$ is read out from the relationship between the pressure P and the cooling water amount Q, as shown in FIG. 3. Based on the cooling water amount $Q_{map}$, the amount Q of the cooling water supplied to the heat exchanger 96 is controlled by the cooling water amount adjustment means 114 (step S34). Thereafter, steps S35 and S36 are carried out.

Consequently, according to the fourth embodiment, the amount Q of cooling water supplied to the heat exchanger 96 in the water electrolysis system 160 is reduced. Therefore, the same advantageous effects as those of the first and second embodiments can be achieved in the fourth embodiment as well. For example, energy consumption required for hydrogen dehumidification can also be minimized in the fourth embodiment.

Figure 13:
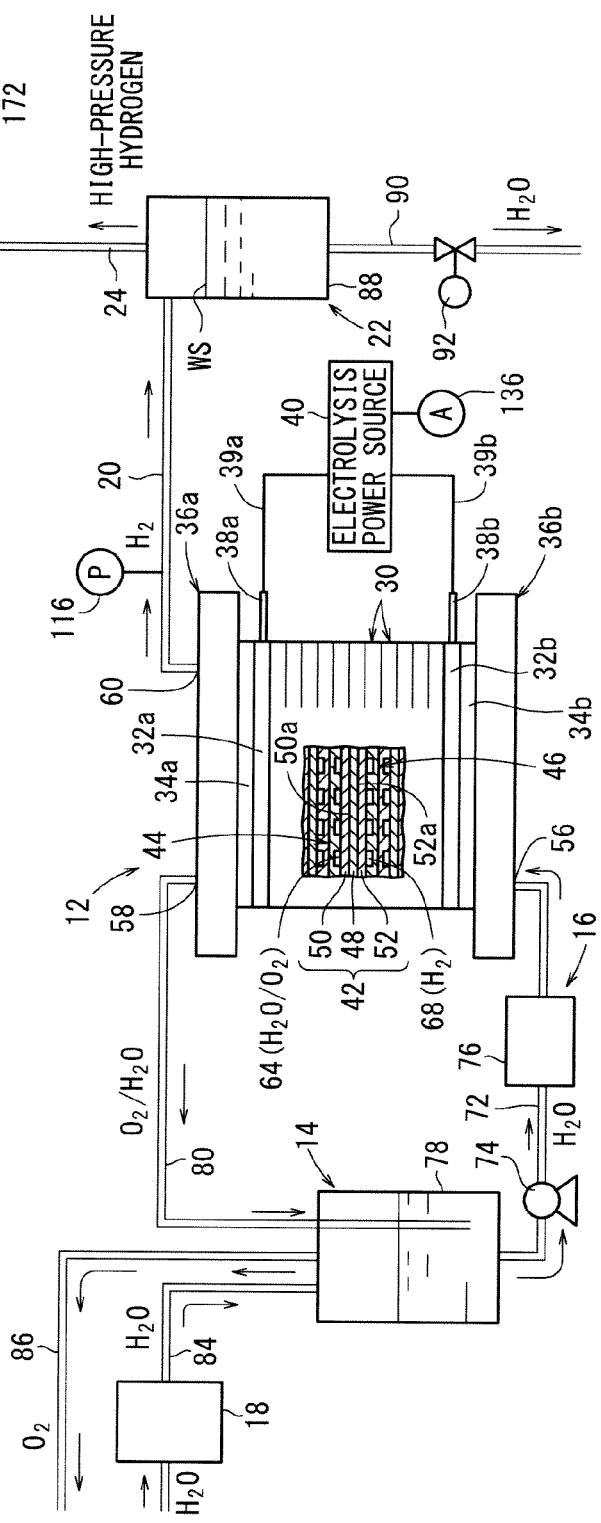
FIG. 13 is a schematic structural view of a water electrolysis system according to a fifth embodiment of the present invention.

A water electrolysis system 170 according to a fifth embodiment of the present invention is shown in FIG. 13.

The water electrolysis system 170 has a cooling unit 172 and a control unit 174, which correspond to the cooling unit 26 and the control unit 132 of the second embodiment. The cooling unit 172 contains the Peltier dehumidifier 94, and the control unit 174 contains the pressure detection means 110, the current adjustment means 112, and the current detection means 134. The water electrolysis system 170 does not include the heat exchanger 96 or the cooling water amount adjustment means 114.

Figure 14:
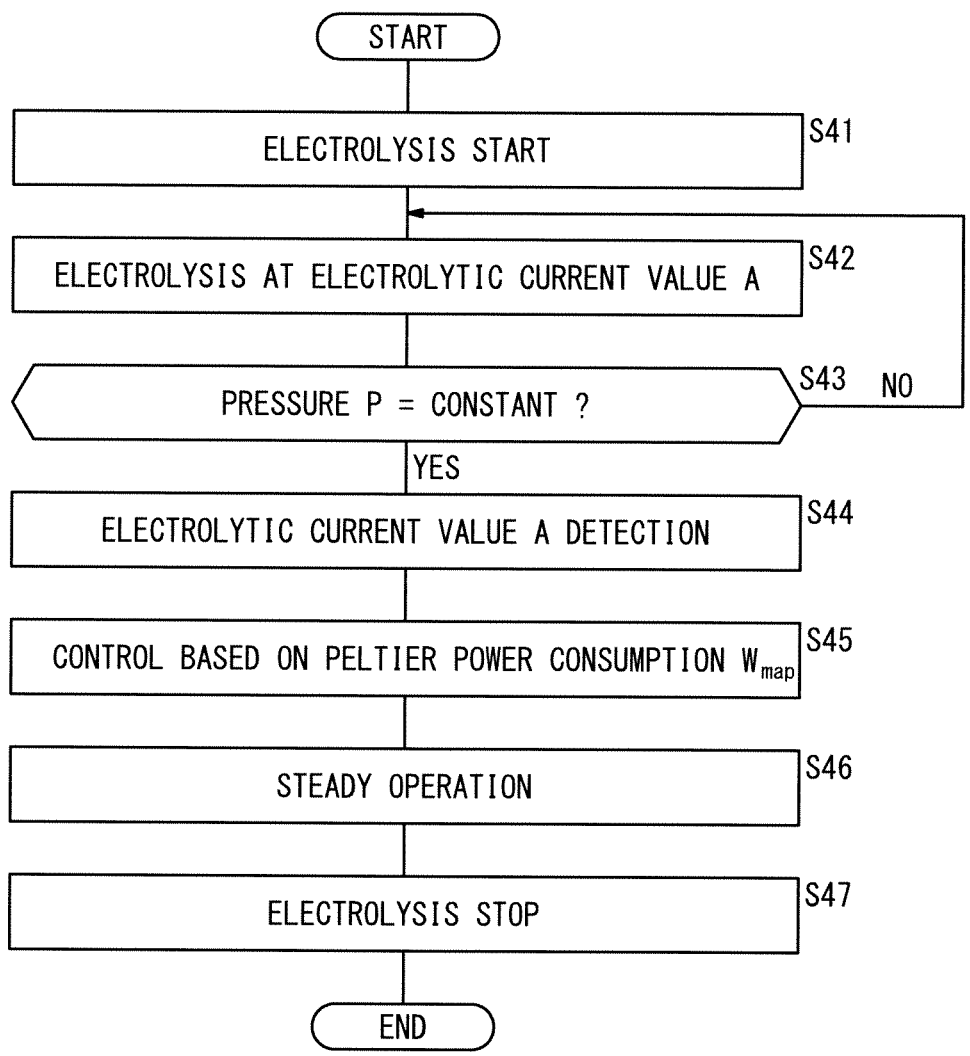
FIG. 14 is a flowchart illustrating operations of the water electrolysis system of FIG. 13.

The water electrolysis system 170 is operated in accordance with the flowchart of FIG. 14, which contains steps S41 to S47. Steps S41 to S44, S46, and S47 are the same as steps S11 to S14, S16, and S17 of the second embodiment (see FIG. 7), respectively, and detailed explanations of such steps are omitted in the fifth embodiment.

After steps S41 to S43, in step S44, an electrolytic current value A is detected by the current detection means 134. Based on the detected electrolytic current value A, the Peltier power consumption $W_{map}$ is read out from the relationship between the electrolytic current value A and the Peltier power consumption W, as shown in FIG. 8. Based on the Peltier power consumption $W_{map}$, the current value applied to the Peltier dehumidifier 94 is controlled by the current adjustment means 112 (step S45). Thereafter, steps S46 and S47 are carried out.

Consequently, according to the fifth embodiment, electricity is not applied excessively to the Peltier dehumidifier 94 in the water electrolysis system 170. Therefore, the same advantageous effects as those of the first to third embodiments can also be achieved in the fifth embodiment. For example, energy consumption required for hydrogen dehumidification can also be minimized in the fifth embodiment.

Figure 15:
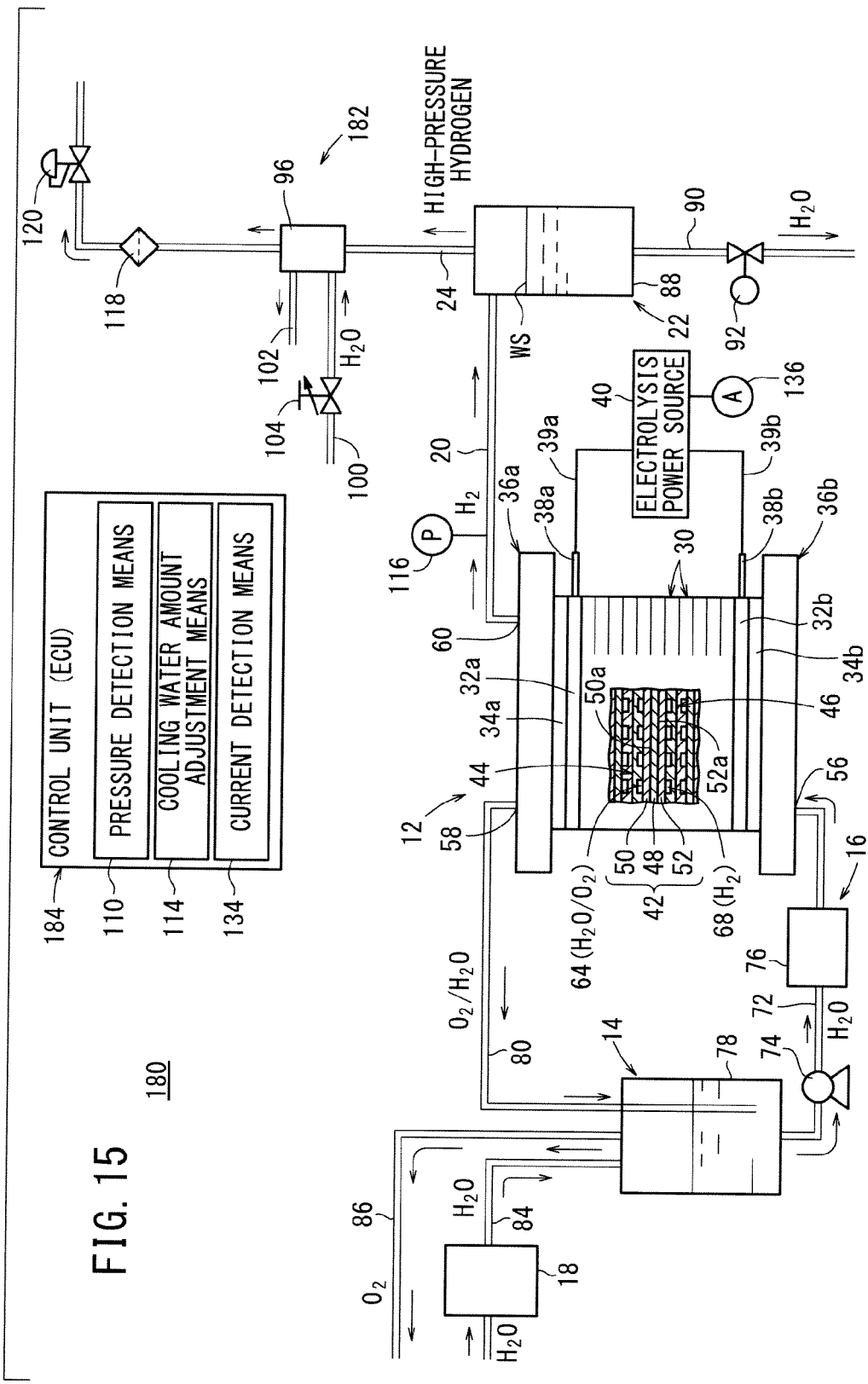
FIG. 15 is a schematic structural view of a water electrolysis system according to a sixth embodiment of the present invention.

A water electrolysis system 180 according to a sixth embodiment of the present invention is shown in FIG. 15.

The water electrolysis system 180 has a cooling unit 182 and a control unit 184, which correspond to the cooling unit 26 and the control unit 132 of the second embodiment. The cooling unit 182 contains the heat exchanger 96, and the control unit 184 contains the pressure detection means 110, the cooling water amount adjustment means 114, and the current detection means 134. The water electrolysis system 180 does not include the Peltier dehumidifier 94 or the current adjustment means 112.

Figure 16:
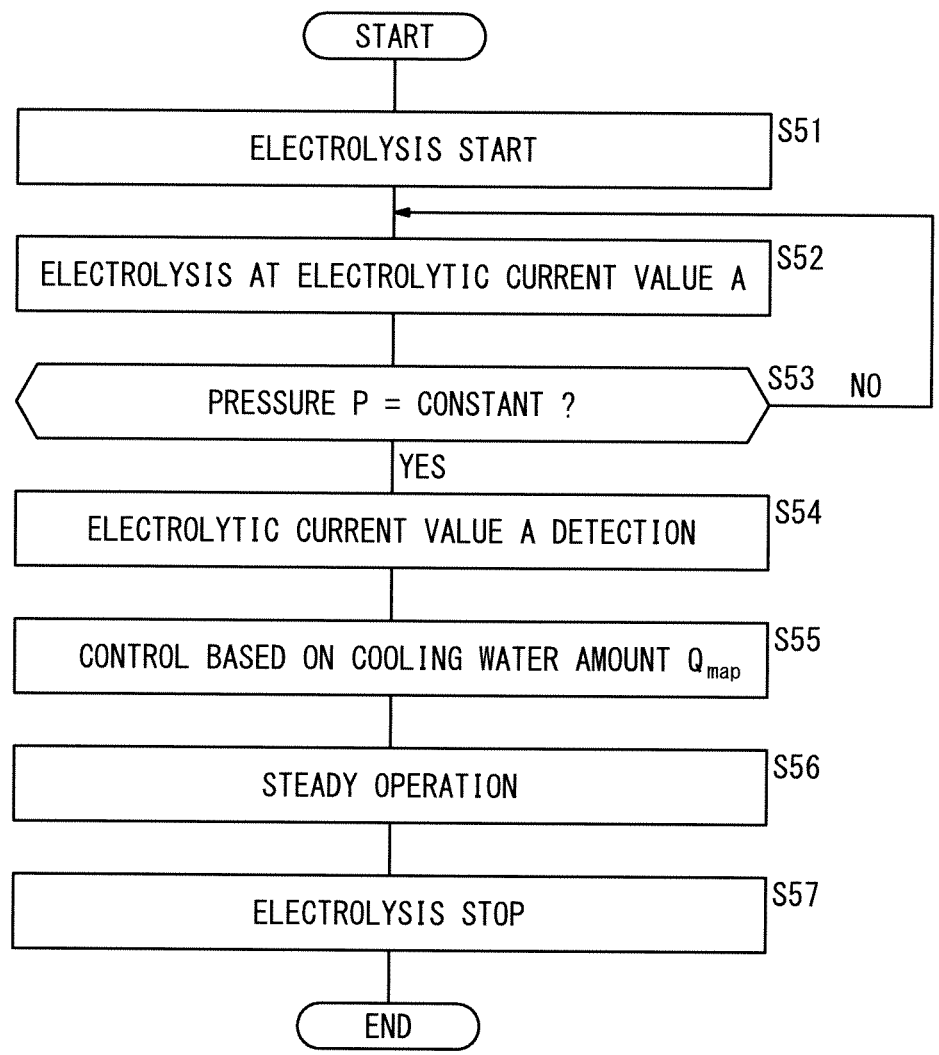
FIG. 16 is a flowchart illustrating operations of the water electrolysis system of FIG. 15.

The water electrolysis system 180 is operated in accordance with the flowchart of FIG. 16, which contains steps S51 to S57. Steps S51 to S54, S56, and S57 are the same as steps S11 to S14, S16, and S17 of the second embodiment (see FIG. 7), respectively, and detailed explanations of such steps are omitted in the sixth embodiment.

After steps S51 to S53, in step S54, an electrolytic current value A is detected by the current detection means 134. Based on the detected electrolytic current value A, the cooling water amount $Q_{map}$ is read out from the relationship between the electrolytic current value A and the cooling water amount Q, as shown in FIG. 8. Based on the cooling water amount $Q_{map}$, the amount Q of cooling water supplied to the heat exchanger 96 is controlled by the cooling water amount adjustment means 114 (step S55). Thereafter, steps S56 and S57 are carried out.

Consequently, in the sixth embodiment, the amount Q of cooling water supplied to the heat exchanger 96 in the water electrolysis system 180 is reduced. Therefore, the same advantageous effects as those of the first, second, and fourth embodiments can be achieved in the sixth embodiment as well. For example, energy consumption required for hydrogen dehumidification can also be minimized in the sixth embodiment.

In order to obtain dry hydrogen more reliably, an adsorber may be placed on a downstream side of the Peltier dehumidifier 94. For example, the water electrolysis system 10, 130, 150, 170 may contain an adsorber that uses a replaceable adsorbent. In this case, as compared with a conventional system, which uses only an adsorber for dehumidification without the Peltier dehumidifier 94, the adsorbent replacement frequency can be significantly reduced in the water electrolysis system 10, 130, 150, 170, because most of the water can be removed by the Peltier dehumidifier 94. In addition, the water electrolysis system 10, 130, 150, 170 can be reduced in size compared to a conventional system.

Figure 17:
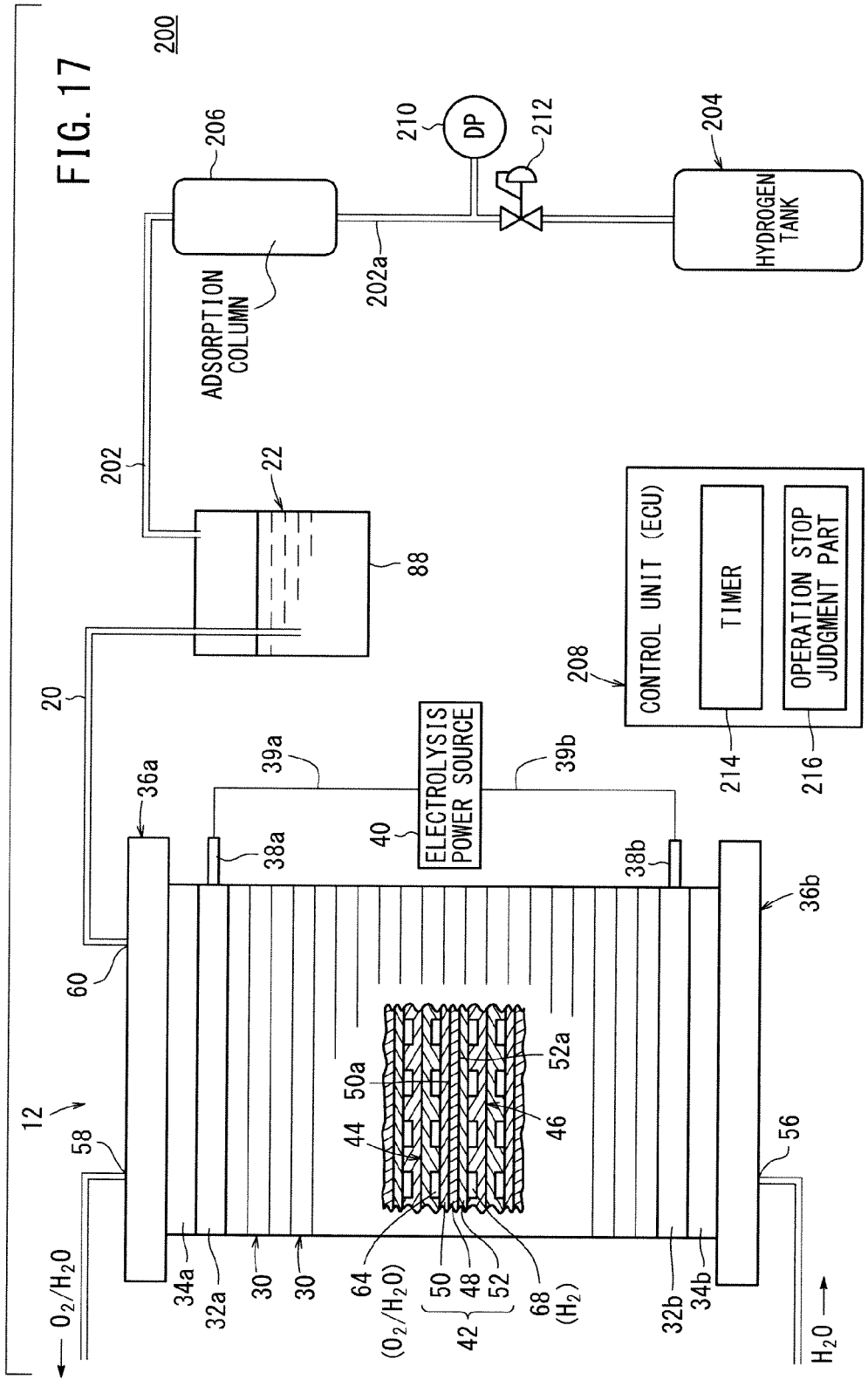
FIG. 17 is a schematic structural view of a water electrolysis system according to a seventh embodiment of the present invention.

A water electrolysis system 200 according to a seventh embodiment of the present invention is shown in FIG. 17. The water electrolysis system 200 includes a hydrogen supply pipe 202 (202a), which corresponds to the high-pressure hydrogen supply pipe 24 of the first embodiment, and further has a hydrogen tank (hydrogen storage unit) 204 for storing high-pressure hydrogen that is discharged from the high-pressure hydrogen production unit 12. In addition, the water electrolysis system 200 has an adsorption column (water adsorption unit) 206 for adsorbing water contained in the high-pressure hydrogen generated in the high-pressure hydrogen production unit 12, and which is placed on the hydrogen supply pipe 202 (202a). Further, the water electrolysis system 200 has a control unit (ECU) 208 for controlling the water electrolysis system 200 in its entirety.

In the water electrolysis system 200, a hydrogen production unit for generating ordinary-pressure hydrogen (i.e., for generating hydrogen and oxygen at the same pressure) may be used instead of the high-pressure hydrogen production unit 12.

The adsorption column 206 and the hydrogen tank 204 are connected in series on the hydrogen supply pipe 202 (202a). High-pressure hydrogen, which is stored in the hydrogen tank 204, can be supplied as a hydrogen product to a fuel cell vehicle (not shown) or the like. A dehumidifying agent, such as an adsorbent (not shown) for removing water contained in the hydrogen, is placed in the adsorption column 206.

A dew point meter (water amount detection unit, DP) 210 and a back pressure valve 212 are arranged in the hydrogen flow direction between the adsorption column 206 and the hydrogen tank 204 on the hydrogen supply pipe 202 (202a). The dew point meter 210 is used for judging whether or not breakthrough of the adsorption column 206 has occurred. Breakthrough implies that the adsorbent has reached the water adsorption saturation point, wherein water that should be removed instead leaks from the adsorption column 206.

The control unit 208 contains a timer 214 for measuring the elapsed time from initiation of the water electrolysis system 200, and further contains an operation stop judgment unit (operation stop judgment device) 216 for stopping operation of the water electrolysis system 200 when the water amount detected by the dew point meter 210 is greater than a threshold amount.

Operations of the water electrolysis system 200 having the aforementioned structure will be described below.

Figure 2:
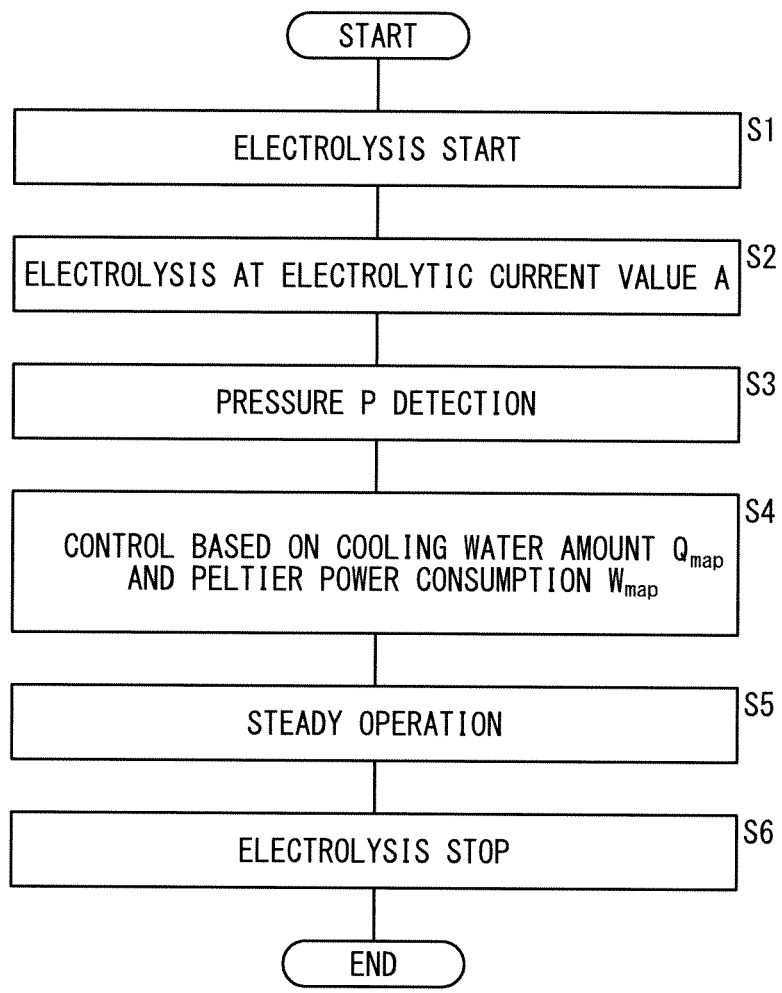
FIG. 2 is a flowchart illustrating operations of the water electrolysis system of FIG. 1.

When electrolysis is started in the water electrolysis system 200 and steady operation (hydrogen production) is started in the high-pressure hydrogen production unit 12, hydrogen is generated in the high-pressure hydrogen production unit 12 and is transferred to the hydrogen supply pipe 202, in the same manner as in steps S2 and S3 according to the first embodiment (see FIG. 2). It should be noted that, during these steps, the back pressure valve 212 remains closed.

Hydrogen in the hydrogen supply pipe 202 is introduced into the adsorption column 206, and water contained in the hydrogen is adsorbed into the adsorbent, whereby the water is removed. When the outlet-side pressure of the adsorption column 206 is increased to the set pressure of the back pressure valve 212, the back pressure valve 212 is opened in order to introduce hydrogen into the hydrogen tank 204. Hydrogen in the hydrogen tank 204 is supplied as a fuel gas to a fuel cell vehicle (not shown), for example.

A method of operating the water electrolysis system 200 according to the seventh embodiment will be described below.

The operation method essentially includes the steps of starting the water electrolysis system 200, measuring the elapsed time from initiation of the water electrolysis system 200, and preventing stopping of electrolysis in the water electrolysis system 200 if the measured elapsed time is less than a set time.

The set elapsed time from starting of the water electrolysis system 200, for which stopping of electrolysis is prevented, is selected beforehand based on the water concentration in the hydrogen tank 204. More specifically, before starting the water electrolysis system 200, when hydrogen in the hydrogen supply pipe 202a between the outlet of the adsorption column 206 and the inlet of the back pressure valve 212 (forming part of the hydrogen supply pipe 202) has a pressure P' (e.g., 35 MPa), a volume V', a compression factor Z', a temperature T', a gas constant R', and a water concentration $C'_{H2O}$, a molar number n' is obtained using the equation $n'=P' \cdot V'/Z' \cdot R' \cdot T'$, and a standard-state volume $V'_{std}$ is obtained using the equation $V'_{std}=(P'/P_{std}) \times (T_{std}/T') \times (V'/Z')$. In the foregoing equation, $P_{std}$ is the standard-state pressure, and $T_{std}$ is the standard-state temperature. Such symbols retain the same meanings in all of the following descriptions.

Meanwhile, before starting the water electrolysis system 200, when the hydrogen in the hydrogen tank 204 has a pressure $P_1$, a volume V, a compression factor Z, a temperature T, a gas constant R, and a water concentration $C_{H2O}$, the molar number n is obtained using the equation $n=P_1 \cdot V/Z \cdot R \cdot T$, and the standard-state volume $V_{std}$ is obtained using the equation $V_{std}=(P_1/P_{std}) \times (T_{std}/T) \times (V/Z)$.

After the hydrogen supply pipe 202a has been filled with hydrogen, the water concentration $C_{H2O\_tank}$ in the hydrogen tank 204 is obtained using the equation $C_{H2O\_tank}=(n \cdot C_{H2O}+n' \cdot C'_{H2O})/(n+n')$, and the standard-state volume $V_{tank\_std}$ of the hydrogen in the hydrogen tank 204 is obtained using the equation $V_{tank\_std}=V_{std}+V'_{std}$. Furthermore, when the hydrogen product has a flow rate F and a water concentration $C_{H2O}$ we, the time (set time) required to reduce the water concentration $C_{H2O}$ tank in the hydrogen tank 204 to a predetermined threshold value (e.g., 5 ppm) is obtained using the equation $t_a=\{(C_{H2O\_tank}-5) \times V_{tank\_std}\}/\{(5-C_{H2O\_we}) \times F\}$.

Figure 18:
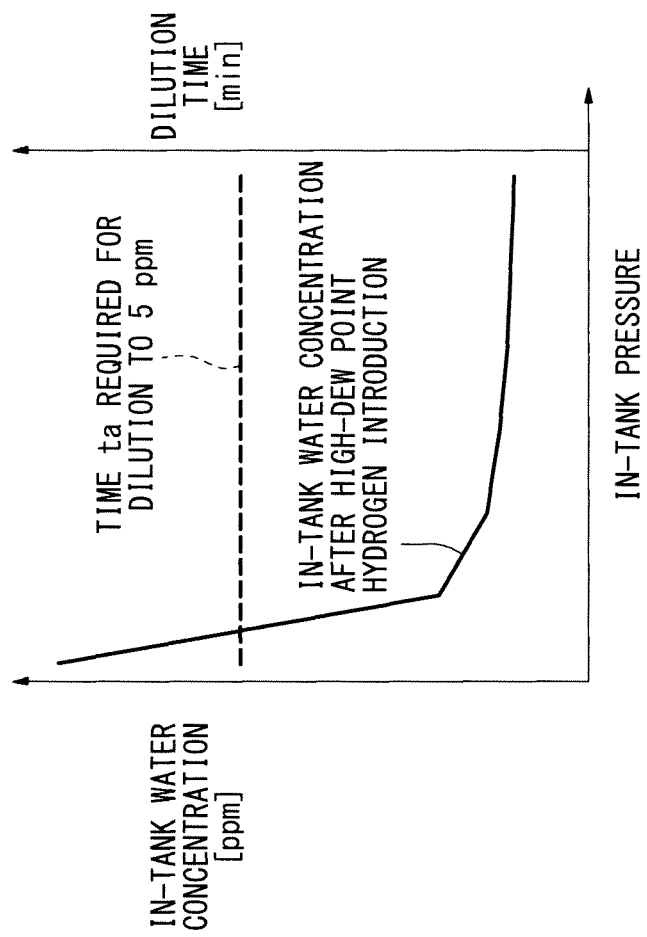
FIG. 18 is a characteristic curve showing relationships between pressure in a hydrogen tank of the water electrolysis system of FIG. 17, water concentration after high-dew point hydrogen introduction, and dilution time.

The pressure $P_1$ in the hydrogen tank 204 and the time $t_a$ required to reduce the water concentration to 5 ppm in the hydrogen tank 204 follow the relationship shown in FIG. 18. Thus, the amount of water introduced into the hydrogen tank 204, and the time $t_a$ required to reduce the water concentration to 5 ppm remain constant regardless of the pressure $P_1$ in the hydrogen tank 204.

Figure 19:
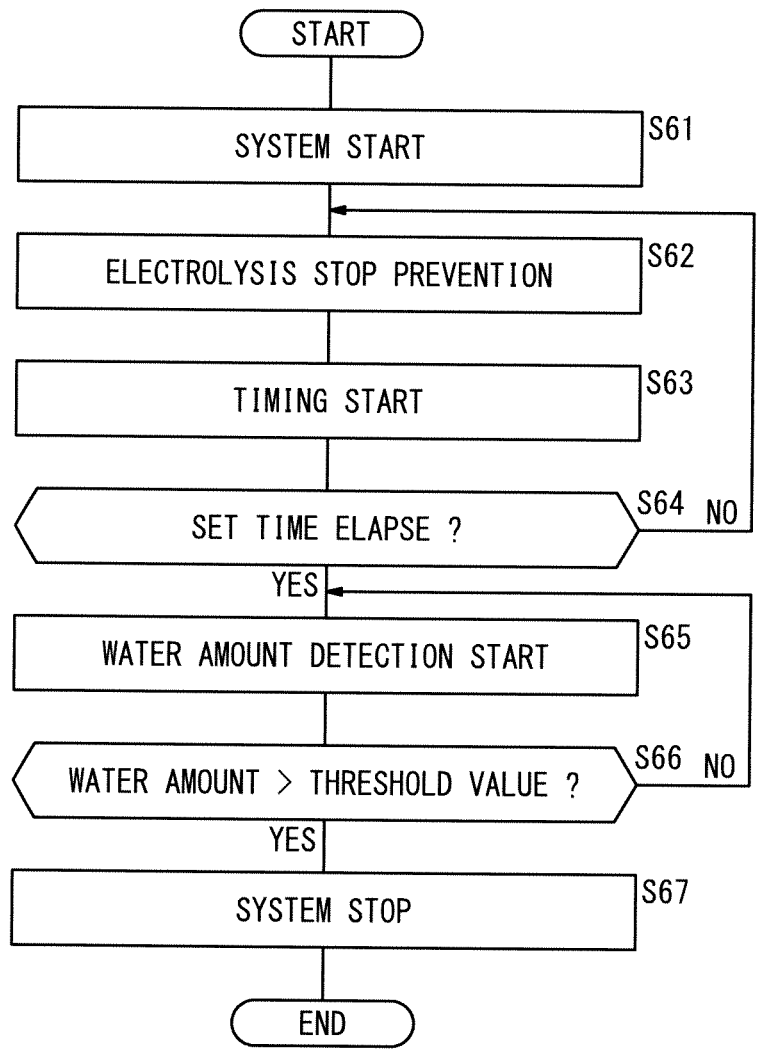
FIG. 19 is a flowchart illustrating operations of the water electrolysis system of FIG. 17.

Operations of the water electrolysis system 200 using the above-described set time will be described below with reference to the flowchart of FIG. 19.

When the water electrolysis system 200 is started (step S61), the control unit 208 acts to prevent stopping of electrolysis in the water electrolysis system 200 (step S62), and measurement of elapsed time performed by the timer 214 is started (step S63).

When the elapsed time measured by the timer 214 is judged to have reached the predetermined set time (the time $t_a$ required to dilute the water concentration to 5 ppm) (YES in step S64), detection of the amount of water contained in the hydrogen that is transferred to the hydrogen tank 204 is started in step S65. More specifically, the amount of water in the hydrogen that is transferred from the adsorption column 206 to the hydrogen tank 204 is detected by the dew point meter 210, which is placed on the hydrogen supply pipe 202a between the adsorption column 206 and the hydrogen tank 204.

Then, in step S66, a judgment is made in the operation stop judgment unit 216 as to whether or not the water electrolysis system 200 can be continuously operated. If the water amount detected by the dew point meter 210 is larger than the predetermined threshold amount (e.g., 5 ppm) (YES in step S66), then the operation stop judgment unit 216 acts to stop operation of the water electrolysis system 200, and a warning message is displayed if necessary (step S67).

When the water electrolysis system 200 is stopped, water frequently becomes attached to the inner side of the hydrogen supply pipe 202 (202a). Water that becomes attached to the hydrogen supply pipe 202 (202a) is likely to enter into the hydrogen tank 204 when the water electrolysis system 200 is started. Therefore, in the event that electrolysis is stopped immediately after initiation of the water electrolysis system 200, the water concentration in the hydrogen tank 204 may be higher than the threshold value (e.g., 5 ppm).

As described above, according to the seventh embodiment, the time required for lowering the dew point in the hydrogen tank 204, so as to reduce the water concentration to the threshold value (e.g., 5 ppm) or less, is used as the set time $t_a$, and stopping of electrolysis in the water electrolysis system 200 is prevented within a set time after initiation of the water electrolysis system 200. Hydrogen generated in the high-pressure hydrogen production unit 12 is supplied from the gas-liquid separation unit 22, through the adsorption column 206, and to the hydrogen tank 204. Therefore, advantageously, water concentration is reliably maintained at the threshold value or less in the hydrogen tank 204.

Figure 20:
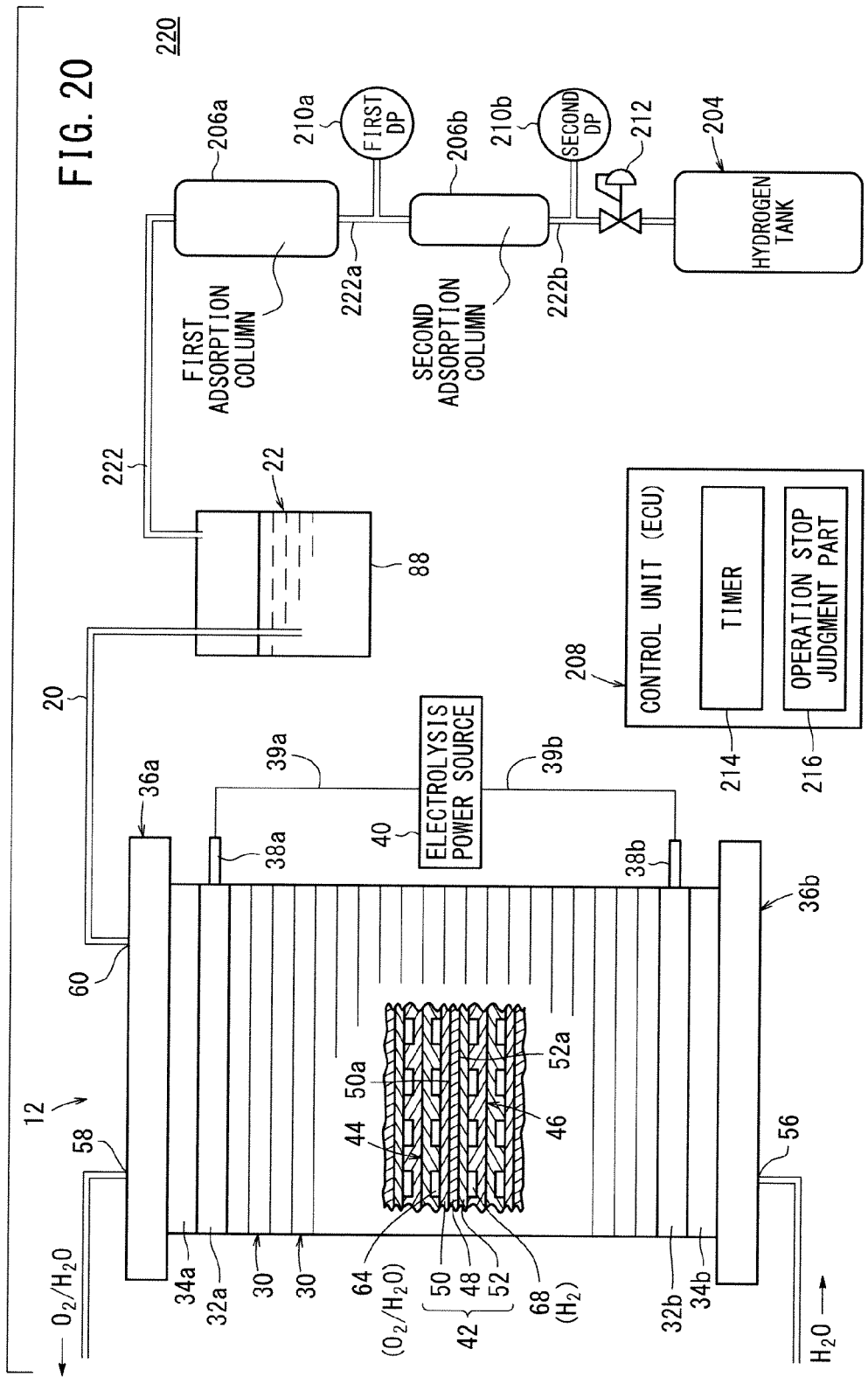
FIG. 20 is a schematic structural view of a water electrolysis system according to an eighth embodiment of the present invention.

A water electrolysis system 220 according to an eighth embodiment of the present invention is shown in FIG. 20. The same components are marked with the same reference numerals as in the water electrolysis system 220 of the eighth embodiment and the water electrolysis system 200 of the seventh embodiment, and detailed explanations of such features are omitted in the eighth embodiment.

The water electrolysis system 220 has a hydrogen supply pipe 222 for transferring hydrogen from the gas-liquid separation unit 22. A first adsorption column 206a, a second adsorption column 206b, and the hydrogen tank 204 are arranged on the hydrogen supply pipe 222 along the hydrogen flow direction.

A first dew point meter (first DP) 210a is connected to a hydrogen supply pipe 222a between the first adsorption column 206a and the second adsorption column 206b. A second dew point meter (second DP) 210b and a back pressure valve 212 are connected respectively to a hydrogen supply pipe 222b between the second adsorption column 206b and the hydrogen tank 204. The respective hydrogen supply pipes 222a and 222b make up parts of the hydrogen supply pipe 222.

The first dew point meter 210a is used for judging whether or not breakthrough of the first adsorption column 206a has occurred. On the other hand, the second dew point meter 210b is used for judging whether or not breakthrough of the second adsorption column 206b has occurred.

In the eighth embodiment, immediately after starting electrolysis in the water electrolysis system 220, electrolysis is carried out for a predetermined time without regard to the water amount (dew point) detected by the first dew point meter 210a. Then, a judgment is made as to whether or not breakthrough of the first adsorption column 206a has occurred based on a value detected by the first dew point meter 210a. The predetermined time may be selected depending on the water-handling capacity of the second adsorption column 206b, etc.

Figure 21:
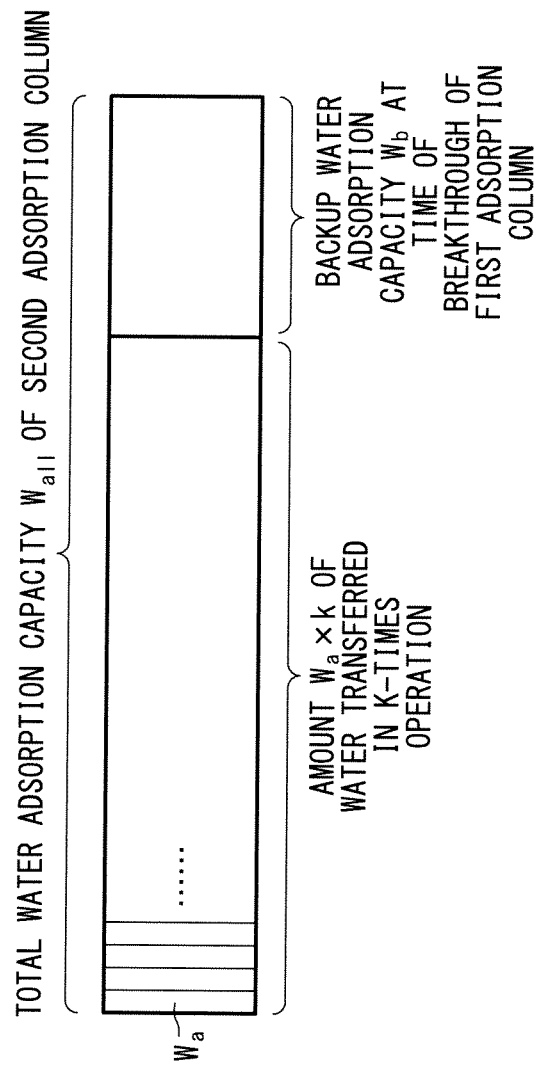
FIG. 21 is a diagram illustrating an amount of water that is adsorbed in a second adsorption column.

More specifically, as shown in FIG. 21, the total water adsorption capacity $W_{all}$ of the second adsorption column 206b is calculated. When breakthrough of the first adsorption column 206a occurs, an amount $W_a$ of water is transferred into the second adsorption column 206b during one operational cycle of the water electrolysis system 220. Further, the water electrolysis system 220 is operated at most k times for a given an interval of time in order to replace the first adsorption column 206a. In this case, the sum of the amount of water transferred to the second adsorption column 206b during the time interval required for replacing the first adsorption column 206a is obtained by the product $W_a \times k$.

When breakthrough of the first adsorption column 206a occurs, the second adsorption column 206b has a backup capacity $W_b$ (an amount of water transferred during a time required for replacement). In this case, the predetermined time is selected in view of satisfying the inequality $W_{all} > W_a \times k + W_b$.

More specifically, the amount $W_{min}$ of water absorbed in the second adsorption column 206b during the predetermined time (e.g., 1 minute) is obtained using the equation $W_{min} = L \times W_1$, where L is a discharge flow amount and $W_1$ is a water amount at a predetermined dew point. In addition, the time $t_{dry}$ (min), at which hydrogen having the predetermined dew point can be dried by the second adsorption column 206b, is obtained using the equation $t_{dry} = W_{all}/(L \times W_1)$.

When operation of the water electrolysis system 220 continues for a given time $t_1$ after breakthrough of the first adsorption column 206a, the predetermined time $t_b$, at which the dew point of the first adsorption column 206a is not detected by the first dew point meter 210a immediately after start of electrolysis, is obtained using the equation $t_b = (W_{all}/L \cdot W_1 - t_1)/k$.

Figure 22:
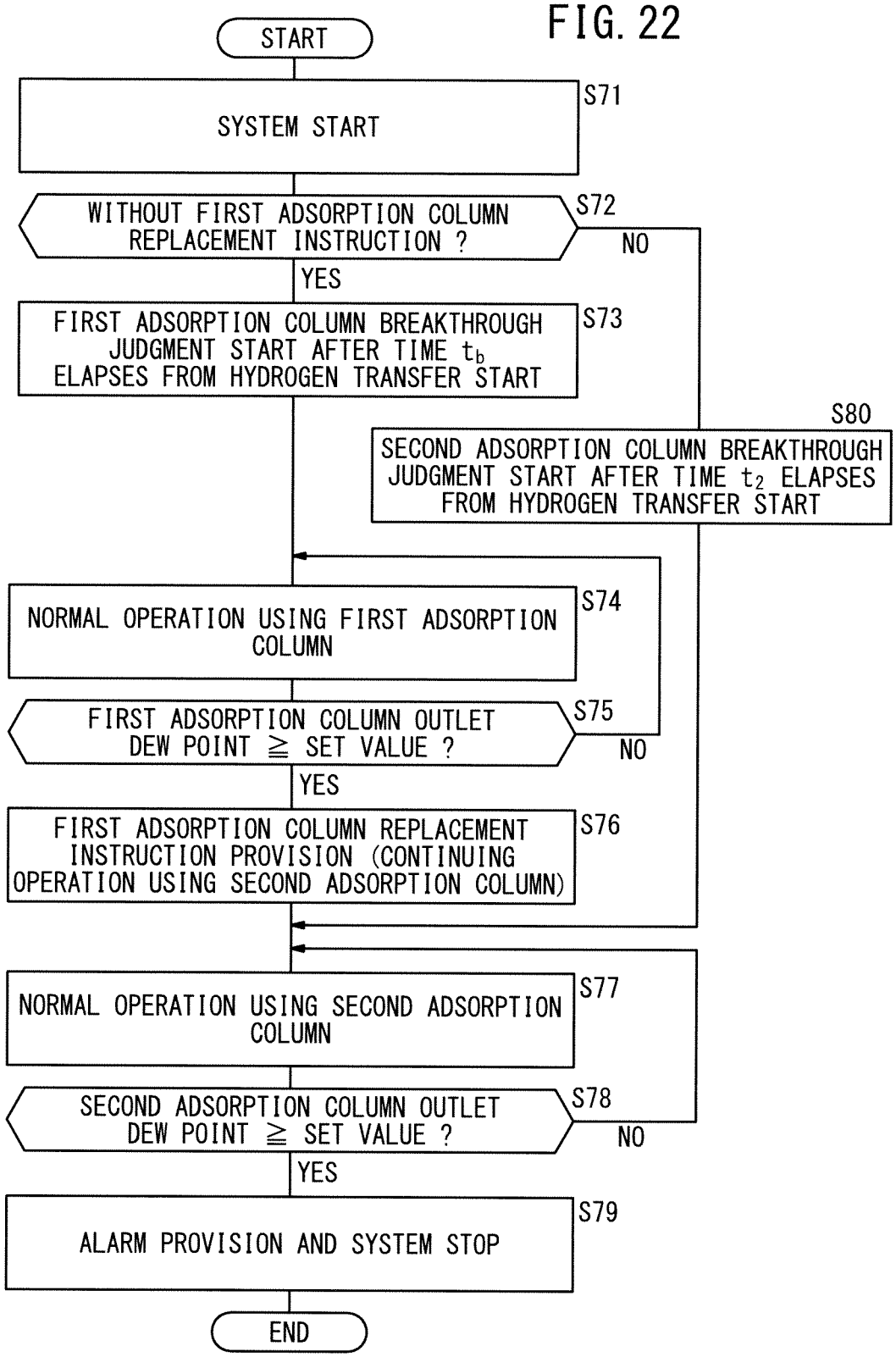
FIG. 22 is a flowchart illustrating operations of the water electrolysis system of FIG. 20.

A method for operating the water electrolysis system 220 according to the eighth embodiment will be described below with reference to the flowchart of FIG. 22.

After the water electrolysis system 220 has been started (step S71), in step S72, it is judged whether or not an instruction to replace the first adsorption column 206a has been provided. If the instruction to replace the first adsorption column 206a is not provided (YES in step S72), then step S73 is carried out. Electrolysis is started, whereupon hydrogen is transferred through the first adsorption column 206a. When a predetermined time $t_b$ has elapsed from starting of the water electrolysis system 220, a judgment is made as to whether or not breakthrough of the first adsorption column 206a has occurred based on a detection signal from the first dew point meter 210a.

Normal operations are carried out using the first adsorption column 206a in step S74. When the dew point in the outlet of the first adsorption column 206a is judged by the first dew point meter 210a to be equal to or greater than the set value (YES in step S75), then in step S76, an instruction to replace the first adsorption column 206a is produced.

Normal operations are further carried out using the second adsorption column 206b (step S77). When the dew point in the outlet of the second adsorption column 206b is judged by the second dew point meter 210b to be equal to or greater than the set value (YES in step S78), then in step S79, an alarm is produced and the water electrolysis system 220 is stopped.

When an instruction to replace the first adsorption column 206a is judged to have been provided (NO) in step S72, it is determined that the first adsorption column 206a is likely to experience breakthrough immediately after starting of the water electrolysis system 220, and step S80 is carried out. In step S80, the second adsorption column 206b is used immediately after starting the water electrolysis system 220. Therefore, in the same manner as the seventh embodiment, an operation using the second adsorption column 206b is carried out for a set time $t_2$ (e.g., the set time $t_a$), and then a breakthrough judgment of the second adsorption column 206b is started. Then, steps S77 to S79 are carried out in the above manner.

As described above, in the eighth embodiment, when the second adsorption column 206b is used immediately after starting the water electrolysis system 220 in step S80, stopping of electrolysis in the water electrolysis system 220 is prevented for a set time $t_2$ after initiation thereof, in the same manner as the seventh embodiment. Therefore, the water concentration can advantageously be maintained at the threshold value (e.g., 5 ppm) or less in the hydrogen tank 204. Furthermore, since the dew point is detected by the second dew point meter 210b after the set time $t_2$ has elapsed, the breakthrough judgment of the second adsorption column 206b can be carried out highly accurately.

In addition, in the eighth embodiment, even when a high dew point is detected by the first dew point meter 210a immediately after starting the water electrolysis system 220, due to water being attached to the inside of the hydrogen supply pipe 222a or the like, operation is continued regardless of the detection result, and then the dew point is detected by the first dew point meter 210a. Thus, an accurate judgment can be made as to whether or not breakthrough has occurred in the first adsorption column 206a.

While the invention has been particularly shown and described with reference to preferred embodiments, it will be understood that variations and modifications can be effected thereto by those skilled in the art without departing from the spirit of the invention as defined by the appended claims.

What is claimed is:

1. A method for operating a water electrolysis system, wherein the water electrolysis system contains:
   a high-pressure hydrogen production unit for electrolyzing water, thereby generating oxygen at an anode side and generating hydrogen at a cathode side;
   a hydrogen storage unit for storing hydrogen discharged from the high-pressure hydrogen production unit;
   a hydrogen supply pipe for supplying hydrogen generated in the high-pressure hydrogen production unit to the hydrogen storage unit; and
   a water adsorption unit, which is connected to the hydrogen supply pipe, for adsorbing water contained in the hydrogen generated in the high-pressure hydrogen production unit,
   the method comprising the steps of:
   starting the water electrolysis system;
   measuring an elapsed time from start of the water electrolysis system; and
   preventing the electrolysis in the water electrolysis system from stopping if the measured elapsed time is less than a set time, so that the water electrolysis system continues the electrolysis at least for the set time,
      wherein the set time, during which stopping of the electrolysis is prevented, is selected based on an initial water concentration in the hydrogen storage unit and a flow rate of hydrogen produced, wherein $$t_a = \{(C_{H2O\_tank} - \alpha) \times V_{tank\_std}\} / \{(\alpha - C_{H2O\_we}) \times F\};$$
   and wherein $\alpha$ is a variable defining a predetermined threshold value of water concentration, F is the flow rate of hydrogen product, $t_a$ is the set time, $C_{H2O\_tank}$ is water concentration in the hydrogen storage unit, $V_{tank\_std}$ is the standard-state volume of the hydrogen in the hydrogen storage unit, and $C_{H2O\_we}$ is the water concentration of the hydrogen flow product.

2. A method for operating a water electrolysis system, wherein the water electrolysis system contains:
   a high-pressure hydrogen production unit for electrolyzing water, thereby generating oxygen at an anode side and generating hydrogen at a cathode side;
   a hydrogen storage unit for storing hydrogen discharged from the high-pressure hydrogen production unit;
   a hydrogen supply pipe for supplying hydrogen generated in the high-pressure hydrogen production unit to the hydrogen storage unit; and
   a water adsorption unit, which is connected to the hydrogen supply pipe, for adsorbing water contained in the hydrogen generated in the high-pressure hydrogen production unit,
   the method comprising the steps of:
   starting the water electrolysis system;
   measuring an elapsed time from start of the water electrolysis system; and
   preventing the electrolysis in the water electrolysis system from stopping if the measured elapsed time is less than a set time,
   wherein the water electrolysis system further comprises:
   a water amount detection unit for detecting an amount of water in the hydrogen supply pipe, and which is connected to the hydrogen supply pipe on a downstream side of the water adsorption unit; and
   an operation stop judgment unit for stopping operation of the water electrolysis system if the water amount detected by the water amount detection unit is larger than a threshold value,
   wherein, after the measured elapsed time becomes equal to or greater than the set time, the operation stop judgment unit starts judging whether or not the water electrolysis system can be continuously operated based on the water amount detected by the water amount detection unit.

3. The method for operating the water electrolysis system according to claim 2, wherein:
   the water adsorption unit contains a first adsorption column and a second adsorption column,
   after starting of the water electrolysis system, the water electrolysis system is operated normally using the first adsorption column within a predetermined time selected depending on a water-handling capacity of the second adsorption column, and
   after the predetermined time has elapsed, the water amount in the hydrogen supply pipe connected to the first adsorption column is detected by the water amount detection unit, which is connected to the hydrogen supply pipe adjacent to the first adsorption column at a downstream side of the first adsorption column, and it is judged whether or not breakthrough of the first adsorption column has occurred based on the detected water amount.

* * * * *